US010601593B2

(12) United States Patent
Antonopoulos et al.

(10) Patent No.: US 10,601,593 B2
(45) Date of Patent: Mar. 24, 2020

(54) TYPE-BASED DATABASE CONFIDENTIALITY USING TRUSTED COMPUTING

(71) Applicant: Microsoft Technology Licensing, LLC, Redmond, WA (US)

(72) Inventors: Panagiotis Antonopoulos, Redmond, WA (US); Donald Alan Kossmann, Kirkland, WA (US); Ravi Ramamurthy, Redmond, WA (US); Kenneth Hiroshi Eguro, Seattle, WA (US); Raghav Kaushik, Kirkland, WA (US); Kedar Dubhashi, Kirkland, WA (US); Arvind Arasu, Redmond, WA (US); Joachim Hammer, Redmond, WA (US); Jakub Szymaszek, Issaquah, WA (US); Bala Neerumalla, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 239 days.

(21) Appl. No.: 15/275,101

(22) Filed: Sep. 23, 2016

(65) Prior Publication Data
US 2018/0091306 A1 Mar. 29, 2018

(51) Int. Cl.
*H04L 9/32* (2006.01)
*H04L 29/06* (2006.01)
(Continued)

(52) U.S. Cl.
CPC ............ *H04L 9/3234* (2013.01); *G06F 21/57* (2013.01); *G06F 21/6218* (2013.01);
(Continued)

(58) Field of Classification Search
CPC ..... H04L 9/3234; H04L 9/088; H04L 63/123; H04L 63/0442; H04L 63/061;
(Continued)

(56) References Cited

U.S. PATENT DOCUMENTS 5,548,770 A * 8/1996 Bridges ............. G06F 17/30445
5,895,467 A 4/1999 Ubell et al.
(Continued)

FOREIGN PATENT DOCUMENTS

WO 2005052841 A2 6/2005

OTHER PUBLICATIONS

Tu, Stephen., "Lecture 20: Security and privacy for data processing", Published on: Mar. 18, 2016 Available at: http://www.cs.berkeley.edu/~stephentu/writeups/6885-lec20-a.pdf.
(Continued)

*Primary Examiner* — Jung W Kim
*Assistant Examiner* — Adrian Stoica
(74) *Attorney, Agent, or Firm* — Alleman Hall Creasman & Tuttle LLP

(57) ABSTRACT

A "Database Confidentiality System" provides various techniques for using server-side trusted computing in combination with configurable type metadata and user- or system-definable rules associated with individual database fields to implement database confidentiality. In various implementations, type metadata and one or more rules are added to each database field. Metadata includes a domain, method of encryption, and a pointer to an encryption key used to encrypt the data in the corresponding field. The rules define one or more operations allowed on the corresponding data types. The type metadata and rules are optionally integrity protected and/or encrypted to avoid unauthorized changes or access. Various encryption techniques (e.g., probabilistic, Paillier, etc.) allow some computations to be performed in an
(Continued)

Exemplary Method for Securing Database Operations untrusted environment without access to the encryption key. This enables the Database Confidentiality System to maintain database confidentiality while performing distributed computation and communications between the untrusted machine and the trusted machine.

18 Claims, 7 Drawing Sheets

(51) Int. Cl.
 G06F 21/62 (2013.01)
 G06F 21/57 (2013.01)
 H04L 9/08 (2006.01)

(52) U.S. Cl.
 CPC .......... *G06F 21/6227* (2013.01); *H04L 9/088* (2013.01); *H04L 63/0442* (2013.01); *H04L 63/061* (2013.01); *H04L 63/123* (2013.01); *G06F 2221/2107* (2013.01)

(58) Field of Classification Search
 CPC . H04L 63/0428; H04L 63/0435; H04L 63/06; H04L 63/12; H04L 9/08; H04L 9/083; H04L 9/32; H04L 9/3236; H04L 9/3242; G06F 21/57; G06F 21/6218; G06F 21/6227; G06F 21/061; G06F 21/62; G06F 21/6245
 See application file for complete search history.

(56) References Cited

U.S. PATENT DOCUMENTS

| | | | | |
|---|---|---|---|---|
| 5,930,801 | A * | 7/1999 | Falkenhainer | G06F 21/6218 |
| 7,246,375 | B1 * | 7/2007 | Jean | G06K 7/0013 235/380 |
| 7,721,345 | B2 | 5/2010 | Redlich et al. | |
| 7,797,342 | B2 | 9/2010 | Banks et al. | |
| 8,458,451 | B2 | 6/2013 | Shasha et al. | |
| 8,639,947 | B2 | 1/2014 | Elovici et al. | |
| 8,874,930 | B2 | 10/2014 | Chase et al. | |
| 9,087,212 | B2 | 7/2015 | Balakrishnan et al. | |
| 10,114,960 | B1 * | 10/2018 | McClintock | G06F 21/62 |
| 2009/0249063 | A1 * | 10/2009 | Sakurai | G06F 21/34 713/159 |
| 2010/0098248 | A1 * | 4/2010 | Anantharaman | G06F 21/6218 380/44 |
| 2010/0306554 | A1 * | 12/2010 | Nunez-Tejerina | G06F 21/6209 713/193 |
| 2012/0023568 | A1 | 1/2012 | Cha et al. | |
| 2014/0281511 | A1 | 9/2014 | Kaushik et al. | |
| 2014/0281512 | A1 * | 9/2014 | Arasu | G06F 21/602 713/165 |
| 2014/0325217 | A1 * | 10/2014 | Mori | G06F 21/6227 713/165 |
| 2015/0134955 | A1 | 5/2015 | Lacaze et al. | |
| 2015/0262185 | A1 | 9/2015 | Abe et al. | |
| 2015/0324606 | A1 * | 11/2015 | Grondin | H04L 63/205 726/1 |
| 2016/0371435 | A1 * | 12/2016 | Pauletto | G06F 16/273 |
| 2018/0032739 | A1 * | 2/2018 | Gupta | G06F 21/602 |
| 2018/0046586 | A1 * | 2/2018 | Venkatesh | G06F 12/1408 |

OTHER PUBLICATIONS

Tu, et al., "Processing Analytical Queries over Encrypted Data", In Proceedings of the VLDB Endowment, vol. 6, No. 5, Aug. 26, 2013, 13 pages.

Agrawal, et al., "Order Preserving Encryption for Numeric Data", In Proceedings of ACM SIGMOD International Conference on Management of Data, Jun. 13, 2004, 12 pages.

Arasu, et al., "Orthogonal Security with Cipherbase", In Proceedings of 6th Biennial Conference on Innovative Data Systems Research, Jan. 6, 2013, 10 pages.

Arasu, et al., "Transaction Processing on Confidential Data using Cipherbase", In Proceedings of 31st IEEE International Conference on Data Engineering, Apr. 13, 2015, 15 pages.

Arasu, et al., "Oblivious Query Processing", In Proceedings of 17th International Conference on Database Theory, Mar. 24, 2014, pp. 26-37.

Aulbach, et al., "Multi-Tenant Databases for Software as a Service: Schema-Mapping Techniques", In Proceedings of ACM SIGMOD International Conference on Management of Data, Jun. 9, 2008, pp. 1195-1206.

Bajaj, et al., "TrustedDB: A Trusted Hardware based Database with Privacy and Data Confidentiality", In Proceedings of ACM SIGMOD International Conference on Management of Data, Jun. 12, 2011, pp. 205-216.

Baumann, et al., "Shielding Applications from an Untrusted Cloud with Haven", In Proceedings of 11th USENIX Symposium on Operating Systems Design and Implementation, Oct. 6, 2014, pp. 267-283.

Boldyreva, et al., "Order-Preserving Symmetric Encryption", In Proceedings of 28th Annual International Conference on the Theory and Applications of Cryptographic Techniques, Apr. 26, 2009, pp. 1-28.

Costan, et al., "Intel SGX Explained", In Cryptology ePrint Archive Report, Retrieved on: Apr. 18, 2016, pp. 1-117.

Eguro, et al., "FPGAs for Trusted Cloud Computing", In Proceedings of IEEE 22nd International Conference on Field Programmable Logic and Applications, Aug. 2012, 8 pages.

Islam, et al., "Access Pattern disclosure on Searchable Encryption: Ramification, Attack and Mitigation", In Proceedings of 19th Annual Network and Distributed System Security Symposium, vol. 20, Feb. 5, 2012, 15 pages.

Gentry, Craig, "Fully Homomorphic Encryption Using Ideal Lattices", In Proceedings of the forty-first annual ACM symposium on Theory of computing, May 31, 2009, pp. 169-178.

Goodrich, Michael T., "Randomized Shellsort: A Simple Oblivious Sorting Algorithm", In Proceedings of the Twenty-First Annual ACM-SIAM Symposium on Discrete Algorithms, Jan. 17, 2010, pp. 1262-1277.

Graefe, Goetz, "The Cascades Framework for Query Optimization", In Proceedings of IEEE Data Engineering Bulletin, vol. 18, No. 3, Sep. 1995, pp. 19-28.

Haas, et al., "Optimizing Queries across Diverse Data Sources", In Proceedings of the 23rd International Conference on Very Large Data Bases, Aug. 25, 1997, pp. 276-285.

Hacigumus, et al., "Executing SQL over Encrypted Data in the Database-Service-Provider Model", In Proceedings of the ACM SIGMOD international conference on Management of data, Jun. 4, 2002, pp. 216-227.

Hellerstein, et al., "Predicate Migration: Optimizing queries with Expensive Predicates", In Proceedings of the ACM SIGMOD international conference on Management of data, May 26, 1993, pp. 267-276.

Juarez, Seth, "Isolated User Mode in Windows 10 with Dave Probert", Video Content Published on: Aug. 5, 2015 Available at: https://channel9.msdn.com/Blogs/Seth-Juarez/Isolated-User-Mode-in-Windows-10-with-Dave-Probert.

Naveed, et al., "Inference Attacks on Property-Preserving Encrypted Databases", In Proceedings of the 22nd ACM SIGSAC Conference on Computer and Communications Security, Oct. 12, 2015, pp. 644-655.

Popa, et al., "An Ideal-Security Protocol for Order-Preserving Encoding", In Proceedings of the IEEE Symposium on Security and Privacy, May 19, 2013, pp. 463-477.

Popa, et al., "Cryptdb: Protecting Confidentiality with Encrypted Query Processing", In Proceedings of the Twenty-Third ACM Symposium on Operating Systems Principles, Oct. 23, 2011, pp. 85-100.

(56) References Cited

OTHER PUBLICATIONS

Sanamrad, et al., "Randomly Partitioned Encryption for Cloud Databases", In Proceedings of 8th Annual IFIP WG 11.3 Working Conference on Data and Applications Security and Privacy, Jul. 14, 2014.

Schuster, et al., "VC3: Trustworthy Data Analytics in the Cloud Using SGX", In Proceedings of IEEE Symposium on Security and Privacy, May 17, 2015, pp. 38-54.

"Always Encrypted (client development)", Retrieved on: Apr. 18, 2016 Available at: https://msdn.microsoft.com/en-us/library/mt147923.aspx.

* cited by examiner

TYPE-BASED DATABASE CONFIDENTIALITY USING TRUSTED COMPUTING

BACKGROUND

Many encrypted databases systems adopt an architecture referred to as client-side encryption. With client-side encryption, data is encrypted on client machines, which are assumed to be secure and have access to all encryption keys. The encrypted data is then sent from clients to a database server where it is stored. Queries are issued by applications at the client and are rewritten by a database driver to encrypt query constants. The rewritten, encrypted queries are then sent to the server and executed. The server returns encrypted query results, which are in turn decrypted by the database driver at the client. In cases where hardware- and/or software-based trusted computing functionality is available to the server, some or all of the encrypted queries received by the server may be executed using that trusted computing functionality.

SUMMARY

The following Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. Further, while certain disadvantages of other technologies may be discussed herein, the claimed subject matter is not intended to be limited to implementations that may solve or address any or all of the disadvantages of those other technologies. The sole purpose of this Summary is to present some concepts of the claimed subject matter in a simplified form as a prelude to the more detailed description that is presented below.

A database is not necessarily secure simply because the data is encrypted and computed upon in a secure or trusted machine. For example, a wide range of operations, if allowed on encrypted data, can expose or leak information regarding that data, even if the encryption is maintained throughout all operations. These and other issues are addressed by a "Database Confidentiality System" as described herein. For example, in various implementations, the Database Confidentiality System provides various techniques for using server-side trusted computing in combination with configurable type metadata and rules associated with individual database fields to implement database confidentiality. In other words, the Database Confidentiality System provides database confidentiality by restricting the operations that can be done on a particular field to only those operations (and specific series of concatenated operations) that are allowed for the desired application.

More specifically, in various implementations, the Database Confidentiality System provides a mechanism that enables users (or an automated database configuration wizard or the like) to define and add or associate type metadata information to each column in a database (or to each field of unstructured data). This metadata includes, but is not limited to, a domain (e.g., the domain of a type defines all the values that an instance of that type may have), method of encryption, and a pointer or other reference to a key used to encrypt the data. In addition, the user (or the automated database configuration wizard or the like) defines or specifies one or more operations allowed on these data types. These allowed operations on typed database fields are referred to herein as "rules."

Further, in various implementations, the type information and/or the rules are integrity protected (e.g., limiting access by MAC address or other mechanism) to avoid unauthorized changes. In addition, in various implementations, the type information and/or the rules are encrypted to prevent the types and rules associated with particular database columns or fields from being viewed by parties not necessary to perform the application. Further, various types of encryption (e.g., probabilistic encryption, Paillier encryption, etc.) allow some computations to be performed in an untrusted environment without access to the encryption key (e.g., operations directly on encrypted data to produce an encrypted result). This enables the Database Confidentiality System to perform distributed computation between the untrusted machine (e.g., performed directly over ciphertext) and trusted machine (e.g., performed by decrypting the data, applying the operation on plaintext, and possibly encrypting the result).

For example, in various implementations, the Database Confidentiality System provides a method for securing database operations (e.g., database confidentiality) on a database comprising a plurality of fields. In various implementations, this confidentiality is implemented, in part, by associating type metadata and rules with each field of the database. The type metadata for each field includes, but is not limited to, a domain of the corresponding field, a method of encryption of the corresponding field, and a reference to a key used to encrypt data in the corresponding field. The set of rules for each field includes, but is not limited to, a restricted set of operations that are allowed to be performed on the corresponding field. The data in each of the fields is then encrypted using the method of encryption and the referenced key defined by the corresponding type metadata. In various implementations, the type metadata and the rules are protected from unauthorized modification via an integrity protection mechanism (e.g., limiting access on a per-computer and/or per-user basis, encryption, read-only configurations, MAC-based accesses, etc.). Given this type of database setup, the Database Confidentiality System performs secure operations limited by the sets of rules on one or more of the encrypted fields via a combination of distributed computation and communications between a potentially untrusted machine (UM) and a trusted machine (TM).

The Database Confidentiality System described herein provides various techniques for using server-side trusted computing in combination with configurable type metadata and rules associated with individual database fields to implement database confidentiality. Advantageously, these techniques protect encrypted databases and operations on such databases from a wide range of active and/or passive malicious attack mechanisms. In addition to the benefits described above, other advantages of the Database Confidentiality System will become apparent from the detailed description that follows hereinafter.

BRIEF DESCRIPTION OF THE DRAWINGS

The specific features, aspects, and advantages of the claimed subject matter will become better understood with regard to the following description, appended claims, and accompanying drawings where:

DETAILED DESCRIPTION

Figure 1:
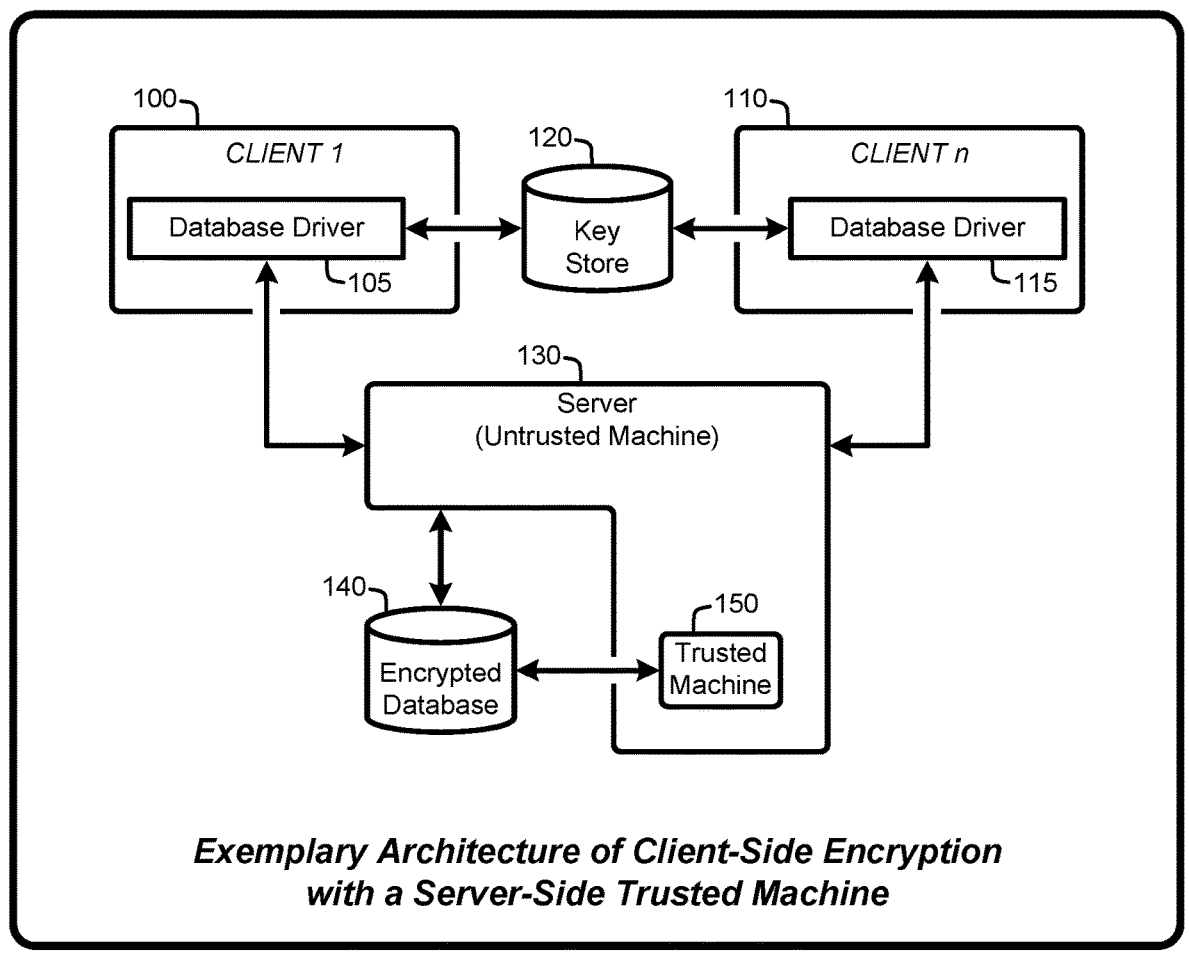
FIG. 1 illustrates an exemplary architecture of client-side encryption with a server-side trusted machine.

In the following description of various implementations of a "Database Confidentiality System", reference is made to the accompanying drawings, which form a part hereof, and in which is shown by way of illustration specific implementations in which the Database Confidentiality System may be practiced. Other implementations may be utilized and structural changes may be made without departing from the scope thereof.

Specific terminology will be resorted to in describing the various implementations described herein, and that it is not intended for these implementations to be limited to the specific terms so chosen. Furthermore, it is to be understood that each specific term includes all its technical equivalents that operate in a broadly similar manner to achieve a similar purpose. Reference herein to "one implementation," or "another implementation," or an "exemplary implementation," or an "alternate implementation" or similar phrases, means that a particular feature, a particular structure, or particular characteristics described in connection with the implementation can be included in at least one implementation of the Database Confidentiality System. Further, the appearance of such phrases throughout the specification are not necessarily all referring to the same implementation, and separate or alternative implementations are not mutually exclusive of other implementations. The order described or illustrated herein for any process flows representing one or more implementations of the Database Confidentiality System does not inherently indicate any requirement for the processes to be implemented in the order described or illustrated, and any such order described or illustrated herein for any process flows do not imply any limitations of the Database Confidentiality System.

As utilized herein, the terms "component," "system," "client" and the like are intended to refer to a computer-related entity, either hardware, software (e.g., in execution), firmware, or a combination thereof. For example, a component can be a process running on a processor, an object, an executable, a program, a function, a library, a subroutine, a computer, or a combination of software and hardware. By way of illustration, both an application running on a server and the server can be a component. One or more components can reside within a process and a component can be localized on one computer and/or distributed between two or more computers. The term "processor" is generally understood to refer to a hardware component, such as a processing unit of a computer system.

Furthermore, to the extent that the terms "includes," "including," "has," "contains," variants thereof, and other similar words are used in either this detailed description or the claims, these terms are intended to be inclusive in a manner similar to the term "comprising" as an open transition word without precluding any additional or other elements.

1.0 Introduction:

There is a fundamental tradeoff between confidentiality and functionality when state-of-the-art cryptography is combined with databases. For example, the more operations that are supported or allowed on encrypted data, the more information that can be leaked unintentionally, thereby potentially reducing confidentiality of the database system. These tradeoffs have previously been studied in the context of property-preserving encryption (PPE) techniques. For example, deterministic encryption can support equality predicates directly over encrypted data, but it is also vulnerable to inference attacks. Further, the emergence of trusted computing platforms opens new security concerns because it allows arbitrary operations to be performed on encrypted data, some of which may then become vulnerable to inference or other attacks. The discussion herein describes examples of various potential vulnerabilities of such systems and provides various techniques to improve confidentiality, functionality, and performance of encrypted database systems. In other words, the Database Confidentiality System described herein provides various techniques that protect encrypted databases and operations on such databases from a wide range of active and/or malicious attack mechanisms.

The Database Confidentiality System described herein provides a foundation for a "confidentiality a la carte" database system that provides tradeoffs between confidentiality, functionality and performance by allowing user selection and configuration of confidentiality at the level of individual data fields. The Database Confidentiality System provides multiple levels of confidentiality based on various property-preserving encryption (PPE) techniques. However, in contrast to existing PPE-based systems, the Database Confidentiality System described herein achieves similar confidentiality levels, but with much higher functionality (e.g., the Database Confidentiality System can implement all of SQL on encrypted data) and potentially better performance because the Database Confidentiality System supports more algorithmic variants (e.g., sort-based algorithms for Probabilistic types).

For purposes of explanation, the following discussion generally refers to use of the Database Confidentiality System in the context of database confidentiality using hardware and/or software based server-side trusted computing. However, the same or similar basic principles and techniques can be applied to problems including, but not limited to, directory services (e.g., LDAP, directory-based identity-related services, centralized domain management, assigning and enforcing security policies for computers and users, etc.), collaboration tools (e.g., intranets, social networks, collaborative websites, file hosting, document and content management scenarios, etc.), and any other structured workload where expression evaluation can be factored out.

In general, the "Database Confidentiality System" provides various techniques for using server-side trusted computing in combination with configurable type metadata and rules associated with individual database fields to implement database confidentiality. Advantageously, security is enhanced because the type- and rule-based processes described herein limit what operations can be performed on the data before access to that data even starts.

For example, in various implementations, the Database Confidentiality System provides a mechanism that enables users (or an automated database configuration wizard or the like) to define and add or associate type metadata information to each column in a database (or to each field of unstructured data). This metadata includes, but is not limited to, a domain (e.g., the domain of a type defines all the values that an instance of that type may have), method of encryption, and a pointer or other reference to a key used to encrypt the data. The combination of the method of encryption and the key used for encrypting the data using that method may be collectively referred to herein as "encryption information." The metadata attached to the database fields is both literal in terms of metadata that defines the types of policies that go with the data and it's also specified by inference in that each field of the database is encrypted using a particular key and encryption technique that is defined by the metadata. So, given this encryption, it becomes more difficult to violate the policies defined by the metadata. Further, in certain cases, encryption may not be desired or necessary for a particular field. As such, in various implementations, lack of a specification of a key and/or encryption method for a particular field is equivalent to specifying a null encryption method and null encryption key for that field.

In addition, the user (or the automated database configuration wizard or the like) defines or specifies one or more operations allowed on these data types. These allowed operations are referred to herein as "rules." For example, rules can be defined to allow an addition to be performed between one value encrypted using a first key and one value encrypted with a second key. The output of this addition will be encrypted with a third key (which can be a one-time-key key, if desired). Another example is that such rules can allow a comparison to be made between two values encrypted using the same key. An output of greater, less than, or equal to can then be output as plaintext. Rules, or sequences of allowed rules, of any desired complexity may be defined and associated with particular database columns or fields. As such, the Database Confidentiality System is not limited to the simplistic examples of rules mentioned above.

In various implementations, the Database Confidentiality System is instantiated in a typical database architecture wherein clients communicate with an untrusted server that in turn communicates with a trusted machine to perform one or more operations on one or more fields of an encrypted database. FIG. 1 illustrates an exemplary architecture of client-side encryption with a server-side trusted machine.

For example, as illustrated by FIG. 1, a plurality of clients (e.g., 100, 110) apply a database driver (e.g., 105, 115) or the like to interact with an encrypted database 140 via a potentially untrusted server 130. Encryption and decryption operations are performed at the client using one or more encryption keys provided via one or more key stores 120. Various database operations are performed by the server 130 by directly acting on the database 140. However, depending on the particular operations being performed, the server 130 causes a trusted machine 150 to perform secure operations on the encrypted database 140. In various implementations, the trusted machine 150 may be hardware and/or software based functionality integral to the server 130, or may be provided by secure computing functionality that is physically separate from the server.

In other words, FIG. 1 illustrates an extended secure database architecture. Here, the server 130 is enhanced with a trusted computing platform that acts as a secure co-processor and runs a particular process defined herein as a trusted machine (TM) 150. Clients (100, 110) grant the TMs 150 access to their encryption keys (through secure protocols), and the TMs can then compute any operation on the encrypted data in the encrypted database 140 by decrypting the data, carrying out the operation, and then encrypting the result. A variety of existing techniques have adopted or explored this architecture.

Figure 2:
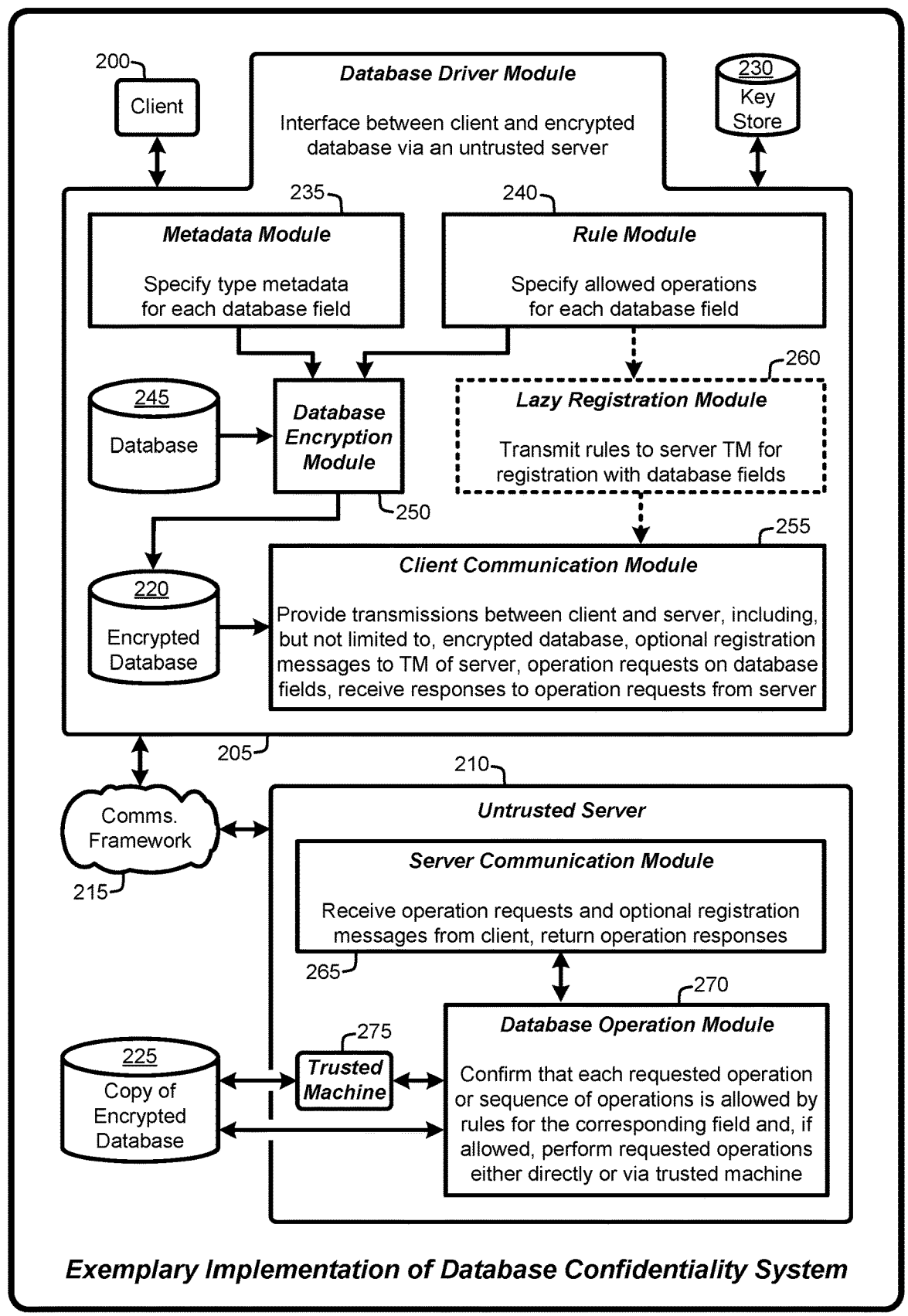
FIG. 2 provides an exemplary architectural flow diagram that illustrates program modules for effecting various implementations of a "Database Confidentiality System," as described herein.

1.1 System Overview:

As mentioned above, the Database Confidentiality System provides various techniques for using server-side trusted computing in combination with configurable type metadata and rules associated with individual database fields to implement database confidentiality. The processes summarized above are illustrated by the general system diagram of FIG. 2. In particular, the system diagram of FIG. 2 illustrates the interrelationships between program modules for implementing various implementations of the Database Confidentiality System, as described herein. Furthermore, while the system diagram of FIG. 2 illustrates a high-level view of various implementations of the Database Confidentiality System, FIG. 2 is not intended to provide an exhaustive or complete illustration of every possible implementation of the Database Confidentiality System as described throughout this document.

In addition, any boxes and interconnections between boxes that may be represented by broken or dashed lines in FIG. 2 represent alternate implementations of the Database Confidentiality System described herein, and that any or all of these alternate implementations, as described below, may be used in combination with other alternate implementations that are described throughout this document.

As illustrated by FIG. 2, in various implementations, the processes enabled by the Database Confidentiality System enable one or more clients 200 to interact with a database driver module 205. The database driver module 205 enables the client 200 to communicate via a communications framework 215 with an untrusted server 210 to perform operations on a copy 225 of an encrypted database 220. In general, the communications framework 215 applies various wired and/or wireless communications techniques to provide communications between the client 200 and the server 210 via any combination of networks, intranets, internet, etc.

More specifically, in various implementations, the database driver module 205 includes a metadata module 235 that enables the client 200 to specify or select type metadata for each field of a database 245. In various implementations, this type metadata for each database field includes, but is not limited to, a domain of each corresponding field, a method of encryption of the corresponding field, and a reference to a key (e.g., key store 230) used to encrypt data in the corresponding field.

In addition, in various implementations, a rule module 240 enables the client 200 to define one or more rules that specify one or more allowed operations (or allowed sequences of operations) for each of the database fields. In general, if a particular operation (or sequence of operations) is not specifically allowed by a rule for a particular field, then that operation (or sequence of operations) cannot be performed on the corresponding field. Further, in various implementations, rules associated with particular fields are protected from unauthorized modification such that an attacker will be unable to change (or optionally view) a rule set associated with one or more database fields.

Given the client 200 defined or selected types (with associated keys) and rules, a database 245 is encrypted by a database encryption module 250 to generate the aforementioned encrypted database 220. This encrypted database 220 is then provided to a client communication module 255 for transmission to the untrusted server 210. In general, the client communication module 255 provides transmissions between the client 200 and the untrusted server 210. In various implementations, these transmissions, include, but are not limited to, sending the aforementioned copy 225 of the encrypted database 220 to the untrusted server 210, sending registration messages received from a lazy registration module 260 to a trusted machine 275 component of the un trusted server, requests from the client 200 to perform operations on one or more database fields, receiving responses from the untrusted server to operation requests sent from the client, etc.

In various implementations, the untrusted server 210 includes a server communication module 265. In general, the server communication module 265 performs various actions, including but not limited to, receiving database operation requests from the client 200, receiving optional registration messages (via the aforementioned lazy registration module 260) from the client, returning responses to operation requests to the client, etc.

In various implementations, following receipt of an operation request (from the client 200 or any other source such as, for example, an admin or an attacker), the server communication module 265 passes that operation request to a database operation module 270. In various implementations, the database operation module 270 first confirms that each requested operation or sequence of operations is allowed by the rules associated with the corresponding field. Advantageously, confirming that such operations are allowed prior to execution of those operations improves database security and confidentiality, particularly in the case of attempted inference attacks. Next, if the requested operations are allowed, and depending upon the particular operation request and associated level of confidentiality, the database operation module 270 then either performs the requested operation directly on the copy of the encrypted database 225, or passes that operation request to the trusted machine 275 component of the untrusted server 210 for processing. Responses to completed operation requests are then passed back to the server communication module 265 and then transmitted back to the client 200 via the client communication module 255.

2.0 Operational Details of the Database Confidentiality System:

The above-described program modules and/or devices are employed for instantiating various implementations of the Database Confidentiality System. As summarized above, the Database Confidentiality System provides various techniques for using server-side trusted computing in combination with configurable type metadata and rules associated with individual database fields to implement database confidentiality. The following sections provide a detailed discussion of the operation of various implementations of the Database Confidentiality System, and of exemplary methods and techniques for implementing the features and program modules described in Section 1 with respect to FIG. 1 and FIG. 2. In particular, the following sections provides examples and operational details of various implementations of the Database Confidentiality System, including:

An operational overview of the Database Confidentiality System;
Considerations of encrypted database systems;
Exemplary architecture and attacker model;
Associating "types" and "rules" with database fields;
Levels of confidentiality; and
SQL updates.

2.1 Operational Overview:

As mentioned above, the Database Confidentiality System provides various techniques for using server-side trusted computing in combination with configurable type metadata and rules associated with individual database fields to implement database confidentiality. The discussion provided herein describes various attacks on encrypted databases, implementation of different levels of confidentiality via the use of types and rules, and enabling use of the entire SQL standard while providing confidentiality.

With respect to attacks, as discussed herein, conventional database techniques enable attackers who have gained control over a server to exploit the TM of that server to break into an encrypted database in the typical data architecture illustrated by FIG. 1. The Database Confidentiality System addresses such attacks by providing increased levels of confidentiality in combination with increased database functionality. In other words, as mentioned above, the Database Confidentiality System provides various techniques that protect encrypted databases and operations on such databases from a wide range of active malicious attack mechanisms.

In general, with respect to levels of confidentiality, the following discussion describes how to implement different levels of confidentiality and relate them to those known from existing PPE-based techniques. For each level, the Database Confidentiality System defines a set of operations implemented in the trusted machine and how the database server uses these operations to implement SQL queries. The Database Confidentiality System can implement much more functionality for the equivalent level of confidentiality than existing systems that rely only on PPE.

Advantageously, the Database Confidentiality System allows use of the entire SQL standard including errors, integrity constraints, and stored procedures which are often limited or even ignored in existing PPE based database systems. For instance, existing PPE techniques such as those used in existing database systems can result in security anomalies. The Database Confidentiality System addresses such issues. Furthermore, the Database Confidentiality System describes which kinds of algorithms (e.g., hashing, sorting, nested-loops, etc.) and index structures are applicable to each level of confidentiality. Advantageously, in various implementations, security is further enhanced by hiding (e.g., only visible to particular MACs), encrypting, or otherwise protecting error results. For example, such features are useful for a variety of protections, including, but not limited to protection against information leakage via various attacks. For example, a division by zero error, if visible to an attacker, can be a potential inference gateway for determining particular data values. In other words, in various implementations, the Database Confidentiality System safeguards error results from unauthorized viewing or access via any desired integrity protection mechanism. Examples of such integrity protection mechanisms include, but are not limited to, limiting access on a per-computer and/or per-user basis, encryption, read-only configurations, MAC-based accesses, etc.

As discussed herein, "confidentiality a la carte" provides a useful paradigm to select acceptable levels of confidentiality, functionality, and performance in a fine-grained way. Further, the use of a server-side TM removes the algorithmic and mathematical limitations of PPE, allowing the Database Confidentiality System to approach the ideal of implementing SQL on strongly encrypted data with acceptable performance.

2.2 Considerations of Encrypted Database Systems:

Typical encrypted database systems attempt to address several basic objectives, including:

1) Confidentiality: Confidentiality ensures that only clients who have encryption keys have access to plaintext data. Under the strongest possible attack scenarios, this characteristic will hold even if the server that runs the encrypted database is compromised. As such, confidentiality guarantees ensure that attackers or hackers who have gained root privileges, other co-tenants of the server, and even database and system administrators or the cloud service provider are, at worst, only able to access encrypted data.

2) Functionality: Encryption is transparent so that applications need not be changed. To this end, the Database Confidentiality System described herein ensures functionality by supporting the entire SQL standard and other modern database features.

3) Performance: Adding encryption comes with a modest performance penalty. For example, an encrypted database system runs queries almost as fast as a traditional database system with no support for encryption.

In general, there is a fundamental tradeoff between confidentiality, functionality, and performance objectives. For example, the result of a filter query is typically much smaller than the size of a table. To minimize communication cost and maintain acceptable performance, it is useful to ensure that the encrypted query results are approximately the same size as queries to an unencrypted (e.g., plaintext) database. At the same time though, revealing the result size may provide valuable information to an attacker. The discussion provided herein outlines several other examples that demonstrate how encrypted database systems can leak information or expose vulnerabilities.

The current generation of encrypted database systems typically leverage known encryption techniques such as property-preserving encryption (PPE) (often also referred to as partially homomorphic encryption). The general idea of PPE is that, depending on the encryption algorithm used, the database system can carry out certain operations directly upon the encrypted data without decrypting the encrypted data. A prominent example of PPE is deterministic encryption (e.g., AES in ECB mode). This type of deterministic encryption produces the same ciphertext when presented with the same plaintext. For example, deterministic encryption exhibits the following property: $x=y \Rightarrow enc(x)=enc(y)$ for two plaintext values, $x$ and $y$, and a deterministic encryption function, $enc(\ )$. As a result, the database system can evaluate equality predicates (e.g., point queries), equi-joins (e.g., foreign-key/primary key joins), and group-by operations. Another prominent example includes typical order-preserving encryption techniques (OPE). In general, OPE exhibits the following property: $x \leq y \Rightarrow enc(x) \leq enc(y)$. With OPE, the database system can execute range predicates, e.g., Top N and order-by operations, directly on encrypted data. Finally, Paillier encryption, another known encryption method, provides techniques that support arithmetics on encrypted data.

Each PPE technique represents one point in the confidentiality/functionality/performance space. For example, OPE supports more operations than deterministic encryption, but it is also known to be less secure. For this reason, some existing encryption systems implement several different PPEs to allow users to select a point in the design space (e.g., confidentiality/functionality/performance tradeoffs) that matches their requirements. One disadvantage of existing PPE-based techniques is that the different techniques do not compose well. For instance, existing systems do not provide mechanisms that operate to combine order-preserving and Paillier encryption to support both arithmetics and range predicates on the same data, e.g., A+B<C, if A, B, and C are encrypted.

Recent advances in trusted computing platforms promise to provide strong security features and support arbitrary computation. For example, various existing secure processors, co-processors, FPGAs, etc., are based upon secure hardware which provides secure storage and compute capabilities. Similarly, various hypervisor extensions, e.g., VSM, are designed to provide stronger isolation and code integrity guarantees. The availability of such platforms gives rise to the extended secure database architecture discussed above with respect to FIG. 1. As illustrated by FIG. 1, the server is enhanced with a trusted computing platform that acts as a secure co-processor and runs a particular process defined herein as a trusted machine (TM). Clients grant the TMs access to their encryption keys (through secure protocols), and the TMs can then compute any operation on the encrypted data by decrypting the data, carrying out the operation, and then encrypting the result. A variety of existing techniques have adopted or explored this architecture.

Compared to existing PPE-based techniques, architectures with a server-side TM offer many more options in the confidentiality/functionality/performance space. One of the main features (and dangers) of architectures with a server-side TM is the ability to compose functionality; e.g., support range predicates and arithmetics on the same encrypted data. TABLE 1, shown below, provides an overview of the functionality supported by existing server-side TM vs. PPE based database schemes. Unfortunately, simply offering trusted computing resources in the server does not address all of the security issues. Some confidentiality/functionality tradeoffs are fundamental, and simple attacks can break into encrypted databases if the TM supports the wrong mix of operations. Advantageously, as discussed in further detail herein, the Database Confidentiality System provides various techniques for limiting the capabilities of the TM via the use of configurable types and rules in order to achieve acceptable levels of confidentiality, functionality, and performance.

TABLE 1

PPE vs. Server TM

| Expression | PPE | | | Server TM |
|---|---|---|---|---|
| | Deterministic | OPE | Paillier | |
| Equality (e.g., point queries, equi-joins, group-by, etc.) | Yes | No | No | Yes |
| Other Comparisons (e.g., ranges, Top N, min, etc.) | No | Yes | No | Yes |
| Addition | No | No | Yes | Yes |
| Other Expressions (e.g., theta-joins, median, casts, etc.) | No | No | No | Yes |
| Compositions | No | No | No | Yes |

2.3 Exemplary Architecture and Attacker Model:

This following paragraphs describe the architecture of FIG. 1 in more detail, an exemplary attack model based on the architecture of FIG. 1, and an example attack.

2.3.1 Fine-Grained Architecture:

In general, in the case of client-side encryption using an architecture such as that illustrated by FIG. 1, confidential data is encrypted at client machines, shipped as ciphertext to the server, and then subsequent queries are encrypted at clients before being sent to the server. Client machines are assumed to be secure and have access to all keys. The server is composed of two parts which collaborate to process queries: (1) an untrusted machine (UM); and (2) a trusted machine (TM). The UM runs on a traditional server (e.g., x86) and the TM runs on a trusted computing platform (e.g., Intel SGX, FPGAs, Trusted Platform Module (TPM), etc.).

One design question is where to draw the line between the UM and TM, e.g., what operations (also referred to herein as expressions) should be implemented by the TM? This decision fundamentally determines the confidentiality, functionality, and performance of the system. Abstractly, there are two possible architectures: (1) coarse-grained and (2) fine-grained.

Various existing techniques adopt the coarse-grained approach, in which the whole database is encrypted (e.g., as blocks or pages) and the TM implements a full-fledged SQL processor. In this case, the UM is merely a gateway that passes encrypted queries to the TM and encrypted results back to clients. Conceptually, the coarse-grained approach is easy to implement because the database engine is almost unchanged. However, this approach has significant security limitations. Further, in a coarse-grain model, the entire database system is part of the trusted code base (TCB). If any part of the TCB has a vulnerability, this can jeopardize the security of the whole system. In the case of a full SQL Server, this would involve running several million lines of complex code in the TM, including concurrency control, recovery, and multi-threading.

Due to this concern, the Database Confidentiality System adopts a fine-grained approach that uses the TM as little as possible. For example, in various implementations, only confidential columns or fields of the database are encrypted and query processing is decomposed between the UM and TM of the server. The UM then carries out operations on unencrypted (e.g., plaintext) data, operations on property-preserving encrypted data if the operation matches the encryption scheme, and any other functionality that does not require decryption (e.g., synchronization, logging and recovery, and replication for high availability). In other words, the combination of the type metadata and rules for particular column or database field is determinative as to whether a requested operation is performed by the TM or the UM.

The fine-grained approach provided by various implementations of the Database Confidentiality System is illustrated by the following example query, which selects all soccer players who have scored 10 goals. In this example, it is assumed that the goals column is confidential:

SELECT*FROM Player WHERE goals=10;

First, the client rewrites this query, encrypting the constant 10. If the ciphertext for 10 is "a!6xB" for example, the rewritten query becomes: SELECT*FROM Player WHERE goals="a!6xB". The client passes the rewritten query to the UM of the server which parses, compiles and optimizes this query just like any other. All algorithms and operators used in the fine-grained approach are the same as, or equivalent to, those used in traditional database systems, e.g., scans and index lookups for filters, nested-loops, index-nested loops, sorting, and hashing for joins and group-by. The difference is in the way the UM and TM collaborate at runtime to evaluate expressions on encrypted data. For the purpose of this example, assume that there is a B-tree index on Player. goals. To protect the confidentiality of the goals scored, the B-tree index is encrypted. If the encryption is in the granularity of B-tree nodes (an alternative is to encrypt individual entries), then the index scan is executed as follows:

1) The UM passes the encrypted root node of the B-tree and the encrypted search key ("a!6xB") to the TM. The TM decrypts the search key and root, carries out a binary search, and returns the pointer to the correct intermediate B-tree node.
2) The UM uses the pointer returned by the TM to fetch the next encrypted Btree node and passes it, along with the encrypted search key, to the TM. The TM in turn returns a pointer to the B-tree node at the next level.
3) This process terminates when the TM returns a pointer to the set of players that match the query. At this point, the UM returns these tuples to the client and the database driver at the client decrypts these values for consumption by the application.

Thus, to implement this index scan operator, the TM supports the following function:

binarySearch(EncryptedNode, EncryptedInteger)→Pointer

If there is no index on the goals column, then one way to implement this query is to scan the entire Player table, calling the TM for each encrypted tuple to determine whether it meets the predicate and, if so, returning it to the client. To support such a table scan, the TM supports the following function:

equal(EncryptedInteger, EncryptedInteger)→Boolean

These are only basic examples to illustrate the division of labor between the UM and TM. However, there are many variants and the functions supported by the TM (e.g., binarySearch, equal, etc.) that greatly impact the confidentiality, functionality, and performance of the system.

One of the advantages of the fine-grained approach adopted by the Database Confidentiality System is that it minimizes the TCB because only simple functions such as binarySearch and equal are implemented in the TM. In the case of cloud-based providers, this small TCB is particularly advantageous because the TM code can be open sourced to help ensure that it does not contain vulnerabilities. Another characteristic of this approach is that it allows users to control the confidentiality, functionality, and performance tradeoffs in a more nuanced manner. For instance, credit card numbers can be given the highest confidentiality guarantees by being strongly encrypted without providing any query functionality. For other kinds of sensitive data, the Database Confidentiality System can limit the operations (via the use of types and rules) to those operations needed to process it, thereby preventing activation of unauthorized operations.

2.3.2 Attacker Model:

The following paragraphs provide an informal description of an exemplary attacker model. Briefly, it is assumed that the client and the TM are trusted and secure and that the attacker can fully observe and manipulate the UM, all other components of the system, and all communication. Specifically, it is assumed that the attacker has the following capabilities (also summarized below in TABLE 2):

1) Database: The attacker can read and modify the encrypted database as stored on disk or in the main memory/caches of the UM.
2) Queries: The attacker can observe all communication between the UM and TM and between the UM and all clients. In particular, the attacker can see queries submitted by clients and the (encrypted) query results returned to the clients.

3) UM: The attacker can read and modify the memory of the UM and change the code that runs in the UM.

4) TM: The attacker can call the TM as often as they want, with any input. However, the attacker cannot read or modify the TM in any way.

The capabilities of attackers on the UM may be limited in practice, but assuming the worst models antagonistic system or database administrators, and cloud providers. Assuming the strongest possible attacker at the UM also helps to reason about the confidentiality of the whole system, where the primary considerations include the capabilities of the TM (e.g., the functions supported by the TM) and the encryption technique used to protect confidential data.

Assuming the attacker has absolutely no access to the TM might be too extreme. For example, it is well known that some existing systems are subject to side-channel attacks. However, these kinds of attacks are not discussed in detail herein.

Under this attacker model, it is easy for the attacker to launch denial-of-service attacks. For instance, the attacker could simply delete the database on disk or overload the TM with garbage requests. The attacker could also drop all traffic between clients and the database server. Such denial-of-service attacks are not discussed in detail herein. In general, the Database Confidentiality System provides various techniques for implementing confidentiality and protecting secrets stored in a database.

TABLE 2

Exemplary Capabilities of Attacker

|  | Read State | Modify State | Observe Messages | Send Messages |
|---|---|---|---|---|
| Client | No | No | Yes | Yes |
| UM | Yes | Yes | Yes | Yes |
| TM | No | No | Yes | Yes |

2.3.3 Example Attack:

There are many ways in which an attacker can infer confidential information with the powerful attacker model presented in the previous sub-section. Many of these attacks have been studied in the past in the context of systems that are based on property-preserving encryption. For instance, it is known that an attacker can reveal confidential information from a database, such as a medical database for example, if the data is deterministically encrypted and the attacker exploits publicly available background knowledge about value distributions. As another example, it is also well known that various disk access patterns can reveal confidential information. All these results are directly applicable to systems that exploit trusted computing platforms. Unfortunately, if not done appropriately, these systems can make things worse, as shown in the following example of an "enumeration attack."

Enumeration Attack: Consider a table, e.g., Scorer(name, goals), which captures the number of goals scored by each named soccer player. Assume that the goals of each player is a secret and probabilistically encrypted (e.g., using AES in CBC mode) and that the name of each player is not a secret (e.g., stored in plaintext). Furthermore, assume that the server-side TM supports +, /, and = operations on probabilistically encrypted data such as goals. Then, an attacker capable of initiating operations on the encrypted data can explicitly determine the number of goals scored by a particular named player, e.g., "Messi" (or any other player), without decrypting any data by using the following sequence of TM calls:

1) TM.divide(Messi.goals, Messi.goals):
   a. Messi.goals is encrypted in this call to the TM. At this point, the attacker only has the ciphertext as is stored in the database.
   b. If the TM returns a "division by zero" error, then the attacker knows that Messi.goals=0.
   c. If no error is returned, then the attacker now has the encrypted form of the Integer 1 as Messi.goals/Messi.goals=1. For purposes of explanation, refer to this ciphertext as EncryptedOne.
2) Initialize variables iEncrypt=EncryptedOne; iPlaintext=1
3) If TM.equal(Messi.goals, iEncrypt)=true, return iPlaintext
   a. Else, if the result of the comparison is false:
      i. Increment iPlaintext by 1
      ii. Increment iEncrypt by calling TM.add(iEncrypt, EncryptedOne)
      iii. Goto Step 3.

In other words, the attacker uses the TM to: 1) enumerate all integers in the "ciphertext space"; and 2) to compare these encrypted integers with all secrets in the database. In general, any combination of arithmetics, comparisons, and errors is dangerous. This observation is humbling because "+" and "=" are basic operations that are likely to be applied to many kinds of data, and both of these operations are needed to fully implement SQL.

2.4 "Types" for Confidential Data:

The following paragraphs first describe, at a high level, various techniques that help to prevent the enumeration attack described above. Next, a description of the type system provided by the Database Confidentiality System is provided. As described in further detail herein, this type system controls which operations the TM is allowed to perform and on what kind of confidential data. Sections 2.5 and 2.6 of this document discuss examples of how this type system can be used to fully implement SQL at different levels of confidentiality. Sections 2.5 and 2.6 also provide a discussion of the performance and functionality implications of this approach.

2.4.1 Reasons for Successful Enumeration Attacks:

In general, the above-described exemplary enumeration attack was successful because the TM assumed in Section 2.3 was poorly designed. There are at least two flaws in the design of that TM. The first is that the "/" operator returned an observable division-by-zero error. Because of this, the attacker can easily discover all records whose value is 0. The second problem is that the TM.equal( ) function returns a plaintext Boolean result. Because of this, the attacker knows when two values match. Taking a step back, one way to prevent the enumeration attack is to design the TM in such a way that the TM only takes encrypted inputs and only returns encrypted outputs. That is, valid results, errors, and Booleans which are the results of comparisons are encrypted. In view of the following discussion, it can be seen that this encrypted in/encrypted out principle is quite powerful and enables the implementation of all SQL SELECT statements using a TM that follows this principle (see Section 2.5 for further discussion of this issue).

Unfortunately, a TM that follows this encrypted in/encrypted out principle is not always sufficient. For example, as will be discussed later, indexes on encrypted data cannot be directly implemented. For example, in various implementations, to implement indexes, the TM returns plaintext values (e.g., pointers) as part of comparisons and binary search so that the UM knows which node to consider next as part of an index traversal. Fortunately, there is another way to prevent the enumeration attack: use different keys to encrypt the inputs and outputs of the TM. In this way, the Database Confidentiality System breaks the cycle that is used to enumerate all integer values. Section 2.5 describes this idea in more detail.

Section 2.6 provides a third approach, which is applied to implement updates. This idea conceals the expressions executed by the TM, with the idea that if the attacker does not know the semantics of an expression, they cannot use the algebraic properties of the expression to mount an attack.

In view of the following discussion, it can be seen that these three techniques are sufficient to implement SQL. However, the Database Confidentiality System can be expanded to make use of additional techniques. In fact, there are many more techniques that can further improve confidentiality, functionality, and performance of the Database Confidentiality System. Examples of these additional techniques include, but are not limited to, database-integrity preserving techniques to limit the number of TM (or UM) calls an attacker (or authorized user) can make and allowing only bulk operations in the TM. In other words, the number of operation requests for one or more fields can be limited. Such techniques can also be expressed using the type system described herein.

2.4.2 Confidential Data Types:

The following paragraphs define a mechanism and framework based on the use of "types" and "rules" associated with database fields to implement various confidentiality features of the Database Confidentiality System by controlling what functions can be applied on which data in the TM.

2.4.2.1 Definitions:

Type: A type (also referred to herein as "type metadata") is defined by its domain D, its encryption method E, and a key K to encrypt values of that type. More formally, a type is defined as a triple, {D, E, K}.

Domain: Similar to various programming environments, the domain of a type defines all the values that an instance of that type may have. Further, the domain of a type may include null or error values. For instance, the Integer domain includes an error value that represents the result of "1/0" (division-by-zero error).

A domain is length indistinguishable if any two values in the domain have the same representational length. A domain is length bounded if there exists an upper bound M for the representational length of any value in the domain. For example, char(n) is length indistinguishable, while varchar (n) is length bounded. A length bounded domain can be made length indistinguishable by padding. Length indistinguishability is useful for formal confidentiality statements because standard encryption schemes such as AES on strings reveal the length and unintended information might be inferred from this length in many applications.

Encryption Techniques: In theory and for the examples described herein, two encryption algorithms are sufficient: (a) "probabilistic" (e.g., AES in CBC mode) encryption that is IND-CPA secure (indistinguishability against chosen plaintext) and (b) "plaintext" (e.g., not encrypted at all for non-confidential data). However, any other desired encryption algorithm or technique can be adapted for use by the Database Confidentiality System by applying the type system and rules described herein. In practice and for performance reasons, the Database Confidentiality System also considers PPE algorithms such as deterministic encryption, as discussed in further detail herein.

Encryption Key: The third component that defines a type is the encryption key. In practice, 256-bit AES keys are common although keys of any desired bit-length can be used by the Database Confidentiality System. For plaintext, no key is needed: e.g., T.K=Ø if T.E=plaintext.

2.4.2.2 Naming Conventions:

For purposes of explanation, the following naming conventions are used for type: First, the term Table.Column is used to denote the type of this specific column. For instance, Scorer.name denotes the type of the name column of the Scorer table.

Second, "one-time-keys" are often used to encrypt query constants or intermediate query results. One-time-keys are encryption keys that can be used for a limited time (e.g., in the context of processing a single query) and are not used to encrypt any data that is persistently stored in the database. Types are based on one-time-keys are denoted using the Temp keyword. For instance, Temp(Scorer.name) denotes a type having the same domain as Scorer.name, uses a one-time-key which is different from the key of Scorer.name, and may also differ in terms of the encryption technique from Scorer.name. Temp(Integer) denotes a type that has the domain Integer, uses a one-time-key which is different from any other key used in the system, and has a custom-defined encryption technique.

Finally, traditional names are used to denote plaintext types. For instance, Integer denotes the traditional, unencrypted Integer type, including the not-a-number (NAN) and null values for integers. Likewise, Boolean denotes the traditional, unencrypted Boolean type of SQL with its three-value logic.

2.4.3 Rules:

The type system of the Database Confidentiality System uses "rules" over types to control which operations are permitted over which types. A rule is of the form:

$$f(T_{i1}, \ldots, T_{in}) \rightarrow \langle T_{o1}, \ldots, T_{om} \rangle$$

where $f$ is an n-ary function with domain $T_{i1}.D \times \ldots \times T_{in}.D$ and range $T_{o1}.D \times \ldots \times T_{om}.D$. Such a rule specifies that the TM can execute f over the inputs encrypted as specified by the input types and produces its outputs encrypted as specified by the output types. For example, the Database Confidentiality System could provide rules for basic functions such as "add", "divide", or "equal". A rule, however, can also specify more complex functions, predicates, and even user-defined functions (as discussed in further detail in Section 2.6.2 of this document). For instance, to evaluate predicates of the form A+B=C on three encrypted integers, the Database Confidentiality System could define the following rule:

addEqual(EncryptedInteger, EncryptedInteger, EncryptedInteger)→EncryptedBoolean.

One advantageous property of the type system described herein is that it is not only relevant for encrypted database systems that make use of a trusted computing platform such as secure hardware. This type system can also be used to reason about encrypted database systems that are based on PPE. These systems are particular, limited versions of more general encrypted database systems that make use of a TM. The properties of each PPE can be expressed using rules. For instance, deterministic encryption can be modeled as a type, T, that is used in the following rule, and no other rule:

equal (T, T)→Boolean

Paillier encryption can be represented using the following rule:

$$add\ (T, T) \rightarrow T$$

According to the above-described attacker model, an attacker or unauthorized user can call the TM to execute function $f$ with any input at any time after a rule for $f$ has been specified and authorized by the owner of the database. Typically, the attacker will call the TM with instances of the right types in order to infer information about these encrypted instances. It is understood that the attacker generally has no advantage to call the TM with plaintext values or instances of mismatched encrypted types. For instance, if the attacker calls an operation such as TM.equal("10", "a!6xB") using the example discussed in Section 2.3.1, when an equal(EncryptedInteger, EncryptedInteger)→Boolean rule has been established, the TM will go through the motions to "decrypt" the (plaintext) input "10" in the same way as the (correctly encrypted) input "a!6xB", and will perform the comparison afterwards. However, the decryption of "10" is unlikely to incidentally also be equal to 10 (and far more likely to be an unpredictable arbitrary value). Thus, the attacker does not learn anything useful from calling the TM in this way.

2.4.4 Schemas with Type Metadata:

To integrate the type system described herein into a relational database system, the Database Confidentiality System extends the SQL data definition language (DDL) in the following ways:

1) Declare and specify all types used in the database.
2) Specify all rules. Rules refer to declared types or temp types with one-time-keys derived from declared types.
3) Associate each column or field of a table or database with a declared type.

The types declared in such a schema are referred to herein as schema types. In contrast to ordinary types which are defined in Section 2.4.2 of this document, schema types are associated to a rule set. In the context of a database and a rule set, it is possible to reason about the information leakage and strength of a type. For instance, assume the use of two types: one for credit card numbers and one for goals scored. Both types could use AES encryption for example. However, it is likely that stronger security guarantees are desired for credit card numbers than for goals scored. This is accomplished by providing a richer set of rules that apply to goals (e.g., an increment function) than for credit card numbers. Thus, the context (rule set and database) determines the strength of a type. This property is formally defined in the following paragraphs. Since the focus of the following discussion is on encrypted database systems, the term type will generally be used in the following discussion, even though strictly speaking the term schema type can be used to refer to a type in the context of a database with a rule set.

Conceptually, the owner or authorized user of a database can freely specify a rule set to their liking. However, the Database Confidentiality System enables an encrypted database system that offers predefined rule sets for different levels of confidentiality because it is so easy to get incorrect (and thus, insecure). Section 2.5 of this document provides examples of such rules that correspond to various levels of confidentiality that are used in practice today.

Several columns of fields of the same or different tables can be associated to the same type. That is, there is an N:1 relationship between columns and types. For instance, often the primary key column, and all foreign key columns that refer to that primary key, have the same type. For brevity and without loss of generality, the following discussion describes various scenarios in which all values of a column are encrypted using the same key, e.g., a column is associated to only one and not multiple types. Although support for multiple encryption keys and types within a column is enabled by the Database Confidentiality System and is useful for multi-tenant database systems, for purposes of discussion and explanation, the following description of the Database Confidentiality System assumes that such multi-tenant databases are horizontally partitioned by tenant.

2.4.5 Type Hierarchy:

The following discussion provides various practical guidelines on how to tradeoff confidentiality, functionality, and performance, and how to select the proper type for each column of the database. As discussed in further detail in Section 2.5 of this document, improved performance can be achieved by sacrificing confidentiality to some degree. To reason about confidentiality, it is possible to define a partial order on types (more precisely, schema types).

For example, given a schema with types $\mathcal{T}$ and rule set $\mathcal{R}$, an information flow graph $G(\mathcal{T}, \mathcal{R})$ is defined as follows:

1) Vertices are the schema types in $\mathcal{T}$.
2) There is an edge $T_1 \rightarrow T_2$ with label $f(i, j)$ if there is a rule involving function $f$ where $T_1$ is the ith input type of $f$ and $T_2$ is the jth output type of $f$.

The set of plaintext terminating walks of a type T, PTWalk(T, $\mathcal{R}$), is the (possibly infinite) set of walks in $G(\mathcal{T}, \mathcal{R})$ that start at vertex T and end in a vertex corresponding to a plaintext type.

It can be shown that $T^{R_1}$ is stronger (e.g., less information leakage) than $T^{R_2}$ iff PTWalk(T, R1) $\subseteq$ PTWalk(T, R2). Here $T^{R_1}$ corresponds to schema type T with rule set $R_1$ and $T^{R_2}$ to schema type T with rule set $R_2$. Intuitively, more paths to a plaintext type mean that $R_2$ is richer than $R_1$ and, in particular, $R_2$ supports more potentially dangerous functionality and thus has more potential information leakage. The information flow graph enables formal reasoning about what functionality is dangerous and further enables reasoning about the confidentiality/functionality tradeoff.

This definition of strength does not consider inference attacks. For instance, according to this definition one type might be stronger than another type, but it might nevertheless leak more information because the attacker has additional background knowledge or its values are stored in a table that allows to infer values using correlations with other values in different columns of the same table. As such, the purpose of this definition of type strength is to help users decide which rule set to use for a given column of the database, given that the attackers background knowledge is independent of this choice. Section 2.5 of this document provides explicit examples of types with different strengths.

2.4.6 Implementation Considerations:

The following discussion describes various potential attacks on encrypted database systems that use trusted computing platforms and implementation of various techniques for avoiding such attacks by controlling the functionality that is supported by the TM via use of the types and rules described herein. Implementation aspects of these techniques include, but are not limited to: (a) how to authorize functionality in the TM via program registration; and (b) query optimization using the type system provided by the Database Confidentiality System.

2.4.6.1 Program Registration:

The user or application developer controls the types for each column or field of the table or database. Correspondingly, the user determines which functions the TM is allowed to process on each type. This process is referred to herein as program registration. In general, program registration works as follows: Program registration is initiated by a client machine that has access to the encryption keys (e.g., see the architecture of FIG. 1, discussed above). For each rule, the client sends a registration message to the TM that contains the name (or specification) of the operations (e.g., a definable and restricted set of operations) that are allowed to be performed on the corresponding column or field of the database and the encryption keys of all input and output types. Further, in various implementations, this registration message is encrypted using the TM's public key so that only the TM can decrypt this registration message and can retrieve the keys.

In various implementations, clients carry out program registration lazily. For example, if a function of a type is never needed by the application, then that function is never registered at the TM and, thus, that function is never exposed to a potential attacker who has access to the TM. This lazy approach to program registration is similar in some respects to existing onion-based techniques. For example, like lazy program registration, various existing systems degrade the level of encryption (using a weaker PPE technique) lazily and as needed by the application by peeling off a layer of stronger encryption from the onion.

However, in contrast to existing techniques, the lazy techniques described herein are significantly less computationally expensive because the existing techniques perform an update of every tuple of the table or database. In contrast, the lazy approach to program registration described herein reduces computational overhead relative to existing onion-based techniques because it involves only sending a single message from a client to the TM. Likewise, deregistering a function in the TM (so that it can no longer be used for the corresponding column or field) reduces computational overhead relative to existing systems as it involves only a single message to the TM. Further, adding a layer of encryption to existing techniques to improve confidentiality is computationally expensive because it again involves updating the whole table or database, thereby shipping the whole table or database from the server to the client, re-encrypting it at the client, and sending the re-encrypted version back from the client to the server.

2.4.6.2 Query Optimization:

The basic principles of query optimization for an encrypted database system are similar to a traditional database system: e.g., enumerate alternative plans, estimate the computational cost of each plan, and select the plan with the lowest computational overhead. Furthermore, the algorithms and operators used in an encrypted database system are similar to those in traditional database systems (Section 2.1). However, one difference is that some of the computations (e.g., hashing a value, comparisons between two values) is carried out by the TM, whereas the bulk of the algorithms and data movement are carried out by the UM.

Query compilation is more complex for several reasons. First, the TM can be seen as additional processing resources. Therefore, encrypted database systems with TMs require distributed query optimization in order to minimize the number of interactions between the UM and TM. An alternative technique is to consider expressions that are evaluated by the TM as expensive UDFs (i.e., update functions) and optimize queries accordingly. Second, encryption may limit the use of certain algorithms; for instance, hash-based algorithms are not applicable to Probabilistic types that represent the strongest level of confidentiality. Third, depending on the rule system, there might be no, one, or several ways to evaluate an expression and query using the TM. Similar issues have been studied in the context of heterogeneous database system with Web sources. For example, consider the following example query in view of example rules ExR1 through ExR7 provided in TABLE 3. However, the Database Confidentiality System is not limited to these exemplary rules.

SELECT R.a+R.b+R.c FROM R

TABLE 3

Exemplary Rules

| | |
|---|---|
| ExR1: | add (R.a, R.b) → R.b |
| ExR2: | add (R.a, R.b) → R.c |
| ExR3: | add (R.b, R.c) → R.c |
| ExR4: | add (Temp(Integer), Temp(Integer)) → Temp(Integer) |
| ExR5: | rotateKey (R.a) → Temp(Integer) |
| ExR6: | rotateKey (R.b) → Temp(Integer) |
| ExR7: | rotateKey (R.c) → Temp(Integer) |

Given the exemplary rules of TABLE 3, there are two ways to execute this query. First, with Rules ExR1 and ExR3. Second, with Rules ExR5, ExR6, ExR7, and ExR4. The first way involves two calls to the TM per record whereas the second way involves four calls so that the first approach reduces computational overhead.

2.5 Levels of Confidentiality:

The following paragraphs define three exemplary classes of schema types: (a) Probabilistic, (b) Deterministic, and (c) Ordered. However, any desired types or classes of schema types may be defined without departing from the scope of the features and capabilities of the Database Confidentiality System. These exemplary classes generally correspond to the "confidentiality à la carte" offerings of state-of-the-art encrypted database systems that are based on property-preserving encryption (PPE). For instance, various existing systems support probabilistic and deterministic encryption with AES. Other existing systems support probabilistic and deterministic encryption with AES and order-preserving encryption with a custom-defined encryption scheme. One difference between the Database Confidentiality System and these existing systems is that, with trusted computing resources, the type- and rule-based features of the Database Confidentiality System support significantly more functionality than existing systems while providing equivalent confidentiality guarantees. This section covers read-only queries. Section 2.6 discusses updates and stored procedures.

2.5.1 Probabilistic Encryption:

Probabilistic is the strongest level of confidentiality. Given a schema with types $\mathcal{T}$ and rules $\mathcal{R}$, a type $P \in \mathcal{T}$ is Probabilistic if there is no path in the information flow graph $G(\mathcal{T}, \mathcal{R})$ from P to a plaintext type.

It follows trivially from this definition that a Probabilistic type uses an IND-CPA (i.e., indistinguishability under chosen plaintext attack) encryption algorithm. Furthermore, it follows that a Probabilistic type is involved only in rules that follow the encrypted in/encrypted out principle which includes the encryption of errors. Various existing systems support this level of confidentiality, but they do not support any operations on probabilistically encrypted data. In contrast, the Probabilistic types provided by the Database Confidentiality System support a rich set of SQL functionality and provides equivalent confidentiality guarantees as existing systems for probabilistically encrypted data.

To demonstrate the expressive power of Probabilistic types, TABLE 4, shown below, provides a set of exemplary rules that are consistent with the aforementioned definition of a Probabilistic type. However, the Database Confidentiality System is not limited to these exemplary rules.

TABLE 4

Illustration of Rules Consistent with Probabilistic Types

| | |
|---|---|
| PR1: | $f(T_1, \ldots, T, \ldots T_n) \rightarrow T_R$ |
| PR2: | $Pred(T_1, \ldots, T, \ldots T_n) \rightarrow EncBool$ |
| PR3: | $identity(T) \rightarrow T_R$ |
| PR4: | $orderPair(R_1, R_2, compare) \rightarrow R_R, R_R$ |

$T, T_R$ are Probabilistic and others are arbitrary types in PR1-PR3; $R_1, R_2$ are any Row Type; and $R_R$ is any Probabilistic Row Type The first rule, PR1, specifies that any expression can be executed on a Probabilistic type as long as all inputs and outputs have a Probabilistic type. Errors which may occur as part of evaluating the expression are encrypted in the result type of PR1 ($T_R$), e.g., overflows as part of additions or division by zero as part of divisions. The expression, $f$, can be any SQL expression, e.g., compositions of arithmetics, string functions, etc. There is no need to encrypt $f$ and hide which expressions are registered in the TM. However, in various implementations, these expressions are encrypted to provide an additional layer of security. The exemplary results presented in this section work even for this strong attacker model. A weaker attacker model in which expressions are encrypted and the attacker does not have this knowledge to implement updates is described in Section 2.6.2 of this document.

Depending on the expression, $f$, in Rule PR1, the condition that all inputs are encrypted and have a Probabilistic type can be relaxed. For instance, if the expression is A+B and A is a secret and B is not a secret (and not encrypted), then evaluating that expression is allowed if the result is encrypted and has a Probabilistic type. This observation is useful for databases in which only few columns contain secrets.

Another interesting way to relax Rule PR1 and extend the expressive power is that depending on the expression, it may be okay to return errors in plaintext. As an example, consider the following expression with S a secret string that has a Probabilistic type:

substring (−1,−1,S)

This expression returns an error because the position and length in the substring function cannot be negative. However, the attacker does not learn anything about S from this error. More formally, the error is a function of the other inputs independent of the (secret) string. So, the following rule would be okay for a Probabilistic type, $T_S$, with domain String, if $T_R$ is also a Probabilistic type with domain String, and E is a plaintext type that returns the error status. $T_R$ may have the same or a different encryption key as $T_S$.

substring (Integer, Integer, $T_S$) → $\langle T_R, E \rangle$

Such a rule helps to implement updates that would otherwise not be possible. (Section 2.6 of this document discusses updates and issues with errors in more detail). However, the following rule would not be okay, if $T_I$ is a Probabilistic type because in this case plaintext errors might give away secrets of values of type $T_I$:

substring ($T_I, T_I, T_S$) → $\langle T_R, E \rangle$

In general, to expose errors, the output error is configured such that it does not depend on any input that has a Probabilistic type.

The second and third rule of TABLE 4, i.e., PR2 and PR3, are particular cases of PR1. They are not needed and are listed here for purposes of explanation and discussion. PR2 specifies that the TM may evaluate any predicate, if all inputs are Probabilistic. Furthermore, PR2 specifies that the result of the predicate is a probabilistically encrypted Boolean value so that the attacker cannot learn anything from the result. An instance of EncBool can take one of the following values: true, false, or unknown (according to SQL's three-valued logic), and an error code, if the evaluation of the predicate failed (e.g., one of the inputs of the predicate contained an error value).

Like PR2, PR3 is a particular case of PR1. PR3 is the identity function that simply re-encrypts its input that is encrypted with the key of $T_1$ using the key of $T_R$. This identity function is used, for instance, to implement casts or rotate the key of a column in the database because many organizations have a security policy that specifies that encryption keys need to change periodically, e.g., daily, weekly, monthly, etc. PR3 is also applicable if $T_1$ is a plaintext type. PR3 is one of the particular cases of PR1 in which the inputs need not be encrypted. This way, PR3 makes it possible to encrypt a column if a column that was previously believed to be non-confidential becomes confidential.

PR4 is different and is used to implement SQL queries on Probabilistic data in an effective way. PR4 specifies the orderPair( ) function that takes two records as input (the fields of these records may be all encrypted, all plaintext, or some encrypted and some not encrypted), a comparison function, and returns the two records ordered according to the comparison function and fully probabilistically encrypted so that no information is leaked from the result. PR4 makes sure that the Database Confidentiality System can sort any table, thereby using BubbleSort or any other oblivious sort algorithm. Quicksort cannot be implemented for Probabilistic types because it requires a partitioning function which gives a plaintext result that specifies whether an element is larger or smaller than another element and, thus, violates the encrypted in/encrypted out principle.

PR4 is defined on records, rather than values of a domain, because the encrypted result does not give any indication of whether the first or the second tuple is smaller; from this point on, the SQL query processor operates on records in which all fields are Probabilistic to avoid any kind of inference attacks on the result of an oblivious sort.

It can be shown that an attacker or unauthorized user does not learn any instance level information about a value of a Probabilistic type. In particular, this can be demonstrated by setting up an indistinguishability experiment where the attacker or unauthorized user is not able to distinguish between two values given an oracle access to the TM and an access to encryption oracles of other types.

Theorem 1: The attacker or unauthorized user does not learn any information about a value of a Probabilistic type other than what she learns from the schema and the (encrypted) database instance (e.g., via correlations with other columns in the same table).

Advantageously, the exemplary rules of TABLE 4 are sufficient to implement any SQL SELECT query. All database operators can be carried out using sort-based algorithms (e.g., joins, group-by, sub-queries, etc.) and expression evaluation. Doing so, each tuple of the final query result is tagged with an EncBool value and the client can filter out the result tuples by decrypting the tuples and this Boolean value. To speed up this filtering at the client, the final query result can be sorted by the EncBool value in the following way: First, all errors (if any), then all true tuples which are part of the query result, and then all unknown and false values. This way, the client can immediately detect whether an error occurred and, if not, quickly extract the result tuples. Such oblivious query processing does not leak information.

Unfortunately, in various circumstances, the performance of query processing on Probabilistic types can be prohibitively poor. For example, the size of a join result is quadratic with the join inputs, independent of the selectivity of the join predicate. Similarly, the amount of data that needs to be shipped from the server to the client for a simple query that applies a filter to a table (e.g., a key-value lookup) is in the same order as the table, independent of the selectivity of the filter predicate. Grouping has the same problem. Finally, there is no way to build and make use of indexes on Probabilistic data. In summary, Probabilistic is an acceptable choice for highly confidential data that is rarely part of a filter predicate, join predicate, or group-by key, or for which performance is not a major concern. To achieve improved performance, the Database Confidentiality System can partially sacrifice confidentiality by using Deterministic and Ordered types, as discussed in further detail in the following paragraphs.

2.5.2 Deterministic Encryption:

In various implementations, the Database Confidentiality System uses deterministic encryption techniques (e.g., AES in ECB mode) as a role model for the Deterministic class of types. Some existing systems make use of deterministic encryption to implement point queries, equi-joins, and group-by operations on encrypted data. Such existing systems can execute a significant subset of SQL's functionality on deterministically encrypted data. However, this extra functionality comes at a price. In particular, compared to probabilistic encryption, deterministic encryption is known to be subject to a number of inference attacks.

As discussed above, trusted computing resources enable the implementation of SQL queries on probabilistically encrypted data. So, one motivation for enabling the use of Deterministic types for TM-based systems is performance, rather than functionality. For example, it is often desirable to support indexes and return encrypted query results whose size is in the same order as the size of plaintext query results of traditional database systems that do not support encryption; e.g., return only a single tuple for a query that performs a key lookup. In terms of confidentiality, one purpose is to provide equivalent confidentiality guarantees as existing systems that use deterministic encryption techniques.

For any domain $\mathcal{D}$, let equal(D,D)→Boolean denote the equality predicate over $\mathcal{D}$. Also, let hash(D)→HashDom denote a cryptographic hash function that maps values of $\mathcal{D}$ to a plaintext hash domain; e.g., for SHA-1, the hash domain is the domain of 160-bit values. Let $f_1 \ldots f_k$ be injective functions; that is, $x \neq yf_i(x) \neq f_i(y)$ for all $i=1 \ldots k$.

Given a schema with types $\mathcal{T}$ and rules $\mathcal{R}$, a type D is Deterministic if:

1) All paths in G($\mathcal{T}$, $\mathcal{R}$) from D to Boolean are of the form:

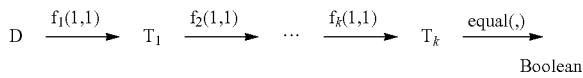

where each $f_i$ is an injective function.

2) All paths in G($\mathcal{T}$, $\mathcal{R}$) from D to HashDom are of the form:

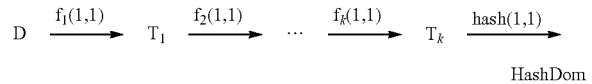

where each $f_i$ is an injective function.

3) For any $T_i$ in (1) and (2) above, there exists a unique path in G($\mathcal{T}$, $\mathcal{R}$) from D to $T_i$.

4) There does not exist any path from D to a plaintext domain that is not Boolean or HashDom.

It can be shown that for any Deterministic type as defined above, an attacker or unauthorized user does not learn any information other than equality over its instances.

Theorem 2: Values of a Deterministic type have similar information leakage as encrypting the values using deterministic encryption.

To implement a Deterministic type, either probabilistic (e.g., AES in CBC mode) or deterministic encryption (e.g., AES in ECB mode) may be used. This choice does not impact confidentiality. For performance reasons, deterministic encryption may be used because fewer calls to the TM will be made in order to implement comparisons and hash values of Deterministic types.

To demonstrate the expressive power of Deterministic types, TABLE 5, provided below, lists some exemplary rules that are consistent with the formal definition of Deterministic types. Specifically, these rules are used to implement indexes and hash-based algorithms such as hash joins. However, the Database Confidentiality System is not limited to these exemplary rules.

TABLE 5

Rules Consistent with Strict Deterministic Types

| | |
|---|---|
| DR1: | $f(T_1, \ldots, T, \ldots, T_n) \rightarrow T_P$ |
| DR2: | $Pred(T_1, \ldots, T, \ldots T_n) \rightarrow EncBool$ |
| DR3: | identity (T) → $T_O$ |
| DR4: | orderPair ($R_1$, $R_2$, compare) → $R_P$, $R_P$ |
| DR5: | equal (T, T) → Boolean |
| DR6: | hash (T) → HashDom |

T is a Deterministic Type; $T_O$ is an Other Deterministic Type; $T_P$ is any Probabilistic Type; $R_1$, $R_2$ are any Row Type; $R_P$ is any Probabilistic Row Type, others are arbitrary types.

Figure 3:
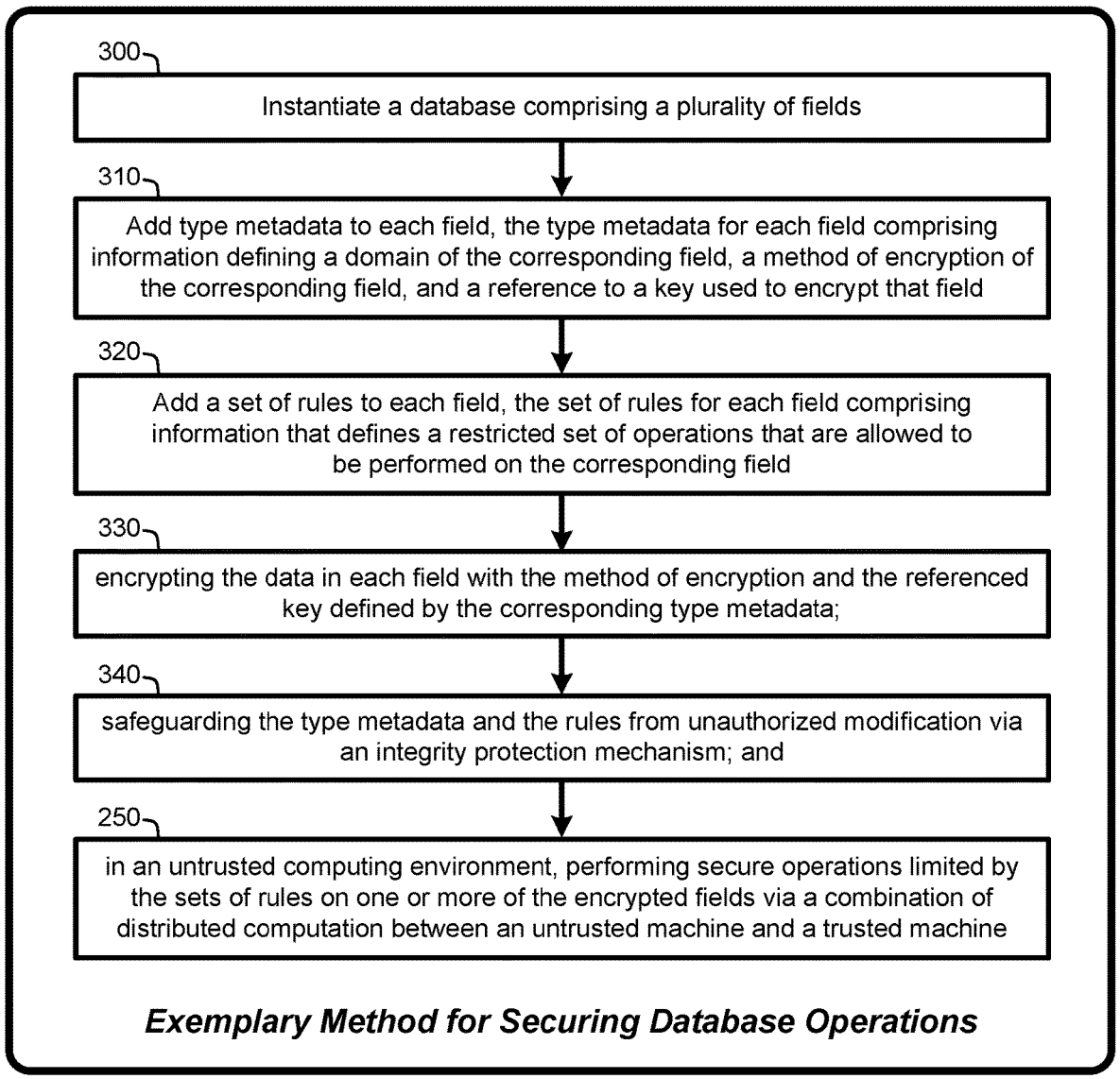
FIG. 3 illustrates a general flow diagram that illustrates exemplary techniques for effecting various implementations of the Database Confidentiality System, as described herein.

The following paragraphs describe Deterministic vs. Probabilistic Types with respect to rules DR1-DR4. Rules DR1 to DR4 of TABLE 5 are similar to Rules PR1 to PR4 for Probabilistic types (see TABLE 4). Since Deterministic types support a superset of rules as compared to Probabilistic types, it is also easy to prove that Deterministic types are weaker than Probabilistic types (see Section 2.4.5). There is, however, one subtle difference in Rules DR1, DR2, and DR4: All the output types are Probabilistic. That is, the result type of the addition of two integers that are instances of Deterministic types is Probabilistic. As a consequence, only the rules of FIG. 3 are applicable to the result of such expressions and Rules DR5-DR6 of TABLE 5 are not applicable. Advantageously, this technique prevents the enumeration attack described above in Section 2.3.3.

Rule DR3 of TABLE 5 has several advantages. The output of DR3 may be a Deterministic type. Similar to rule PR3 of Probabilistic types, Rule DR3 addresses two issues: (a) casts (e.g., conversion from Integer to Float) and (b) key rotation (e.g., re-encrypting a column with a new key). Casts are frequent in practice and are not supported in existing encrypted database systems based on PPE.

The following paragraphs describe Strict vs. Relaxed Deterministic Types with respect to rules DR5 and DR6. DR5 and DR6 model the properties of deterministic encryption. So, with deterministic encryption to implement Deterministic types these rules are not needed because these functions can just as well be implemented in the UM in a similar way as in any database system that exploits PPE. One useful observation is that neither equal nor hash produce errors. A bit trickier are null values. These cannot be kept secret in a Deterministic type because the comparison with a null value is the Boolean value unknown in SQL's three-value logic. If null values need to be kept confidential, then Deterministic types are not the right choice. This observation holds also for various existing encrypted databases that are based on PPE.

Rules DR5 and DR6 of TABLE 5 model deterministic encryption in a strict way. With trusted computing resources, a more general variant of these rules can also be implemented. This variant of DR5 and DR6 (i.e., DR5' and DR6') is shown below in TABLE 6 along with an additional rule, DR7'. However, the Database Confidentiality System is not limited to these exemplary rules.

TABLE 6

| Rules for Relaxed Deterministic Types | |
|---|---|
| DR5': | equal $(T_1, T_2) \to$ Boolean |
| DR6': | hash $(T_2) \to$ HashDom |
| DR7': | evalExpr $(T_1, \ldots, T_1,$ expression$) \to$ Temp $(T_1)$ |

$T_1, T_2$ any relaxed Deterministic Types, $T_1\mathcal{D} = T_2\mathcal{D}$

The variants of the rules illustrated in TABLE 6 enables the comparison of values of two Deterministic types with the same domain, but different encryption keys. For example, it allows hash joins between two columns that are encrypted using different keys. For this reason, DR6' uses the hash function of $T_1$ to hash values of $T_2$. One application for this relaxed variant is a security policy that rotates the encryption keys of primary key columns and foreign key columns individually. During this rotation process the relaxed policy would allow efficient primary key/foreign key joins (e.g., using hash joins, index nested-loop joins, etc.) even at a moment after the primary key column has been re-encrypted and before the foreign key column has been re-encrypted. Such relaxed Deterministic types could also result, e.g., from rules identity$(T_1) \to T_o$ and identity$(T_2) \to T_o$ where $T_1$, $T_2$ and $T_o$ are Deterministic types.

Unfortunately, in some circumstances, the relaxed rule set of TABLE 6 might be vulnerable to additional inference attacks by correlating (encrypted) values of $T_1$ and $T_2$ which are not supposed to be correlated.

The following paragraphs describe composing expressions and index lookups using rule DR7' of TABLE 6. For example, if there is an index on column R.a, then the purpose is to be able to use this index for all sargeable predicates; e.g., predicates of the form: R.a=expression.

If the expression is a constant or a parameter of the query, then this constant or query parameter can be encrypted with the key of R.a, and the index can be used in a straightforward way using any Deterministic type (relaxed and strict). However, for more complex expressions, this approach no longer works. The purpose of Rule DR7' of relaxed Deterministic types is to evaluate such expressions and use the index.

As an example, consider the following query with a query parameter, : x:

SELECT*FROM R,S WHERE R.a=S.a+:x;

This query cannot be executed in typical encrypted databases if R.a and S.a are encrypted deterministically, even if R.a and S.a are encrypted using the same key. This query can be executed in a TM independent of the types and keys of R.a and S.a (Probabilistic, strict Deterministic, or relaxed Deterministic). However, the index on R.a is used only if both R.a and S.a have relaxed Deterministic types (possibly with different encryption keys) and the rules of TABLE 6 are available. DR7' is used to evaluate the expression S.a+:x by encrypting the query parameter (:x) using the key of S.a. As such, DR7' corresponds to DR1 which enables computation of any kind of arithmetics on any kind of Deterministic type. One difference between DR7' and DR1 is that DR1 mandates that the result is Probabilistic, whereas DR7' specifies that the result of S.a+:x is also an instance of a relaxed Deterministic type. This way, Rules DR5' and DR6' become applicable to the result of S.a+:x and the index on R.a can be used to probe the matching tuples.

In order to understand the details of this approach, the following discussion describes various techniques for building and probing indexes on columns with relaxed Deterministic types. For example, rather than building the index on the encrypted values (e.g., ciphertext) as done by various existing systems, the Database Confidentiality System builds the index on hashes. More specifically, before inserting a new key into the index, the Database Confidentiality System calls the TM in order to determine the hash of that key, thereby using Rule DR6 (or DR6' which is a generalization of DR6 in this particular case). To probe a key, k, during query processing, in various implementations, the Database Confidentiality System applies the following approach:

1) Compute hash(k). If k is of type R.a, then use Rule DR6. If k is of type Temp(R.a) use Rule R6'.

2) Use the index to lookup hash(k).

3) For all matches i with hash(i)=hash(k), check whether k=i. If the type of k is R.a, then this test can be done directly without using the TM. If the type of k is Temp(R.a), then call the TM to do this comparison (Rule DR5').

Advantageously, this approach prevents the above-described enumeration attack because a new, different encryption key is used to encrypt the result of an expression. This way, the cycle is broken which is needed to enumerate all values of a domain in the enumeration attack.

2.5.3 Ordered Encryption:

The last and lowest level of confidentiality described herein is Ordered. Ordered types are modeled using order-preserving encryption (OPE) as a role model. Order-preserving encryption has been studied extensively in the past. It is controversial whether it is strong enough for practical applications. As such, it is described herein for completeness without addressing its practicality.

The purpose of OPE is to provide efficient implementations of range predicates and Top N queries. For example, when using ordered indexes such as B-trees. Ordered types can be formalized by using a function such as compare($\mathcal{D}$, $\mathcal{D}$)→{-1,0,1} instead of equal in the definition of Deterministic.

Within the framework described herein, Ordered types can be implemented by enabling the following additional rule in addition to the exemplary rules for Deterministic types provided in TABLE 5:

compare ($T_1$, $T_2$)→{-1,0,1}

By supporting this additional rule, it can be seen that Ordered types are weaker (in terms of confidentiality) than Deterministic types which are in turn weaker than Probabilistic types.

As an encryption technique, any OPE technique or deterministic encryption technique or even probabilistic technique can be used. In terms of confidentiality and functionality, the choice of the encryption technique does not matter, assuming that the crypto is strong and cannot be broken. However, OPE achieves improved performance because it avoids calls to the TM, in the same way as deterministic encryption achieves improved performance for Deterministic types.

2.5.4 Implementation Considerations:

The preceding paragraphs described three levels of confidentiality based on different encryption techniques, including Probabilistic encryption techniques, Deterministic encryption techniques, and Ordered encryption techniques, with Probabilistic encryption techniques providing the highest level of confidentiality. These three levels differ in terms of confidentiality and in terms of performance. In terms of confidentiality, these levels correspond to the levels of confidentiality supported in state-of-the-art encrypted database systems using PPE, e.g., the lower levels of confidentiality, Deterministic and Ordered, are known to be vulnerable to more inference attacks. However, in terms of performance, a lower level of confidentiality can improve performance in two ways: 1) It allows the use of a wider range of algorithms and index structures; and 2) intermediate result sizes are smaller.

TABLE 7, provided below, shows examples of algorithms that can be applied to particular kinds of encrypted data.

TABLE 7

Confidentiality Levels and Permissible Algorithms

| | Encryption Type | | |
|---|---|---|---|
| Algorithm Type | Probabilistic | Deterministic | Ordered |
| Nested-loop Algorithms | Yes | Yes | Yes |
| Sort-based Algorithms | Yes | Yes | Yes |
| Hash-based Algorithms | No | Yes | Yes |
| Equality Indexes | No | Yes | Yes |
| Ordered Indexes | No | No | Yes |

For example, in view of TABLE 7, using a TM, scan-based and sort-based algorithms (e.g., nested-loop joins, sort-merge joins) can be applied to any kind of data. Hash-based algorithms (e.g., hybrid-hash joins), however, are applied to Deterministic and Ordered types. Likewise, Deterministic and Ordered types can make use of indexes.

TABLE 8, provided below, shows the size of encrypted results, depending on the operation and the level of confidentiality. For instance, the size of the encrypted result of a filter is of the same order as the size of the base table (denoted as O(n) in TABLE 8) as discussed above in Section 2.5.1 of this document. Obviously, this results in poor performance if further operations such as joins are applied to the result of the filter or large result sets are to be transmitted to the client. However, queries that apply an aggregate (e.g., count) after the filter can be processed fairly efficiently even on Probabilistic types.

TABLE 8

Confidentiality Levels and Result Sizes

| | Encryption Type | | |
|---|---|---|---|
| Operation | Probabilistic | Deterministic | Ordered |
| Aggregation | O(1) | O(1) | O(1) |
| Equi-Joins | O(max($n_1$, $n_2$)) | O(r) | O(r) |
| Theta Joins | O($n_1 * n_2$) | O($n_1 * n_2$) | O($n_1 * n_2$) |
| Filter (Equality) | O(n) | O(r) | O(r) |
| Filter (Range) | O(n) | O(n) | O(r) | n, $n_1$, $n_2$ represent the size of the input tables;
r is the size of the result table Overall, these results confirm the advantages of the confidentiality a la carte approach enabled by the Database Confidentiality System that allows users to choose the type and rules for each column or field depending on the workload and confidentiality requirements. This is particularly useful for enterprise workloads and benchmarks such as existing TPC-C benchmarks. For instance, it is typically affordable from a performance perspective to use a Probabilistic type for credit card numbers whereas it is acceptable to use a Deterministic type for order numbers because inference attacks are difficult for order numbers as the attacker likely does not have much background knowledge on order numbers. Confidentiality a la carte can also be offered with systems that are based on PPE only. However, these systems severely limit the kinds of functions that can be applied to encrypted data, whereas all SQL SELECT statements are executable with trusted computing resources, regardless of the level of confidentiality.

2.6 SQL Updates:

The focus of the preceding discussion section was on reads. It was shown that any SQL SELECT statement can be executed on encrypted data and that the performance depends on the level of confidentiality. The following paragraphs discuss updates and the changing of confidentiality guarantees as a result of implementing such updates. The following discussion first demonstrates why updates are problematic and then provides various techniques for implementing updates.

2.6.1 Encrypted Update Issues:

Consider the following exemplary SQL update statement that gives all employees a 10 percent salary increase:

UPDATE Emp SET salary=1.1*salary

If the salary column is confidential, this query (as written) cannot be implemented securely, independent of the level of confidentiality (Probabilistic, Deterministic, or Ordered). The issue is that the multiplication can result in an integer overflow, which is encrypted to guarantee confidentiality as shown in the following example attack which degrades Probabilistic and Deterministic types to Ordered types.

Implicit Comparison Attack: Assume that the definition of Probabilistic and Deterministic types is changed so that errors are not encrypted and an attacker can learn about the error behavior of an update function. In this case, the enumeration attack of Section 2.3.3 becomes applicable to Probabilistic and Deterministic types in the following way:

Input: two confidential values $v_1$ and $v_2$
Output: 1 if $v_1 > v_2$, −1 if $v_1 < v_2$, 0 if $v_1 = v_2$
for ({i1=0; v=$v_1$}, v ≠ error, {v=TM.multiply(1.1,v); i1++});
for ({i2=0; v=$v_2$}, v ≠ error, {v=TM.multiply(1.1,v); i2++});
if (i1<i2) return 1
if (i1>i2) return −1
return 0

For reads, errors are not a problem since the encrypted results (including encrypted errors) are sent to the client, which decrypts and handles error values (see Section 2.5 of this document). Since this is performed on the client, an attacker has no way to detect when an error occurs.

Unfortunately, concealing errors from the UM (and thus potential attackers) is a concern for the implementation of updates. For example, in the event of an error anywhere in the statement, the entire update statement fails and any changes that were made are undone. In this case, the UM carries out the undo operation. Furthermore, error values are not written into the database, which would corrupt the data and cause spurious results for subsequent queries; e.g., a "count(*)" query.

This issue with error handling is not specific to the use of server-side trusted computing. These observations also apply to systems that are based on PPE. For instance, Paillier encryption does not handle overflow errors correctly: it wraps overflows resulting in incorrect values in the database when such overflows occur in the context of an update statement. Advantageously, with trusting computing resources there are workarounds (see Section 2.6.2 of this document) whereas such workarounds do not exist with PPE.

Integrity Constraints: Integrity constraints are also an issue. This is because checking an integrity constraint implicitly carries out a comparison. In this way, an attacker can exploit integrity constraints to degrade a Probabilistic type to a Deterministic type. For example, the attacker can compare two values, $v_1$, $v_2$, of a Probabilistic type:

1) Create an empty table, Attack, with a single column, value. Create a unique (or primary key) integrity constraint on Attack. value.
2) Insert $v_1$ into Attack.
3) Insert $v_2$ into Attack. If this insertion fails, the attacker can infer that $v_1 = v_2$.

Type System Issues: Even in the absence of errors, the "increase salary" update statement illustrated above is problematic in the system described here if salary has a Deterministic or Ordered type. In order to prevent enumeration attacks (see Section 2.3.3 of this document), both Deterministic and Ordered types dictate that the result of an expression (e.g., 1.1*salary) is encrypted using a different key than the input. In the context of an update statement, however, the result of the expression is encrypted using the same key because it is written back into the column. Although it would be technically valid to re-encrypt the whole column with a new key, this solution would be computationally expensive.

Unproblematic Updates: Examples of problematic cases are highlighted in the following paragraphs. Fortunately, there are many update statements that are not problematic and can be implemented in a straightforward way using the exemplary rule sets described in Section 2.5 of this document. For instance, any update or insert expression that does not invoke an error is safe on Probabilistic types. Furthermore, for data with known ranges, errors can be eliminated in practice by using a larger domain, e.g., 64 or 128-bit integers.

2.6.2 UDFs for Updates:

As mentioned in Section 2.4.1, there are a number of techniques that can be applied to implement problematic updates. This section discusses an example of an approach that is both simple and general: the execution of (user-defined) update functions (UDF) in the TM.

The idea here is to execute any expression that may raise an error entirely in the TM. To this end, in various implementations, the Database Confidentiality System provides a new higher-order rule that takes an encrypted expression as input and applies this expression to other parameters:

$$\text{evalUDF}(T_1, \ldots, T_n, \text{expression}) \rightarrow (T_R, \text{Boolean})$$

The result of evalUDF is a value of type $T_R$ and a flag that indicates if an error occurred during the evaluation of the expression. The UM calls the evalUDF function of the TM for every tuple that needs to be inserted or updated. If no error occurred, the UM uses the encrypted result to do the update. If an error occurred, the UM rolls back the entire update operation.

Expanding upon the aforementioned increase salary example, the client would generate the following program as update expression:

```
:newvalue, :error computeNewSalary(:oldsalary) {
    :oldvalue = decrypt(:oldvalue)
    :newvalue =:oldvalue * 1.1;
    catch :e
    return :newvalue, true;
    return :newvalue, false;
}
```

Furthermore, the client would encrypt this program and pass the encrypted form to the UM. Then, it would rewrite the update statement in the following way in order to make sure that the UM uses the UDF to evaluate the update expression:

UPDATE Emp SET salary=computeNewSalary(salary)

This approach is secure if the attacker does not know the functionality that is implemented by the program. This is why it is encrypted and can only be decrypted by the TM. When the program is executed on the TM, the attacker does not know why an error occurred, only that it did via the error flag returned by the evalUDF function. If the attacker knows the semantics of the UDF, she may be able to exploit this information. For instance, if she knows that the UDF implements a monotonically increasing function, she can mount the implicit comparison attack described in Section 2.6.1 of this document. In this way, the UDF approach can degrade confidentiality, but it might be secure enough for many application scenarios.

The UDFs approach is universal and allows the Database Confidentiality System to implement all update/insert expressions, deal with errors, and (almost) all issues described in Section 2.6.1. However, there is one exception: UDFs do not address the referential integrity constraint issue on Probabilistic types. As such, integrity constraints are restricted to Deterministic and Ordered types. As mentioned earlier, it is not possible to have it all (confidentiality, functionality, and performance), even with a trusted compute platform, so confidentiality a la carte remains a useful principle for encrypted databases.

Figure 4:
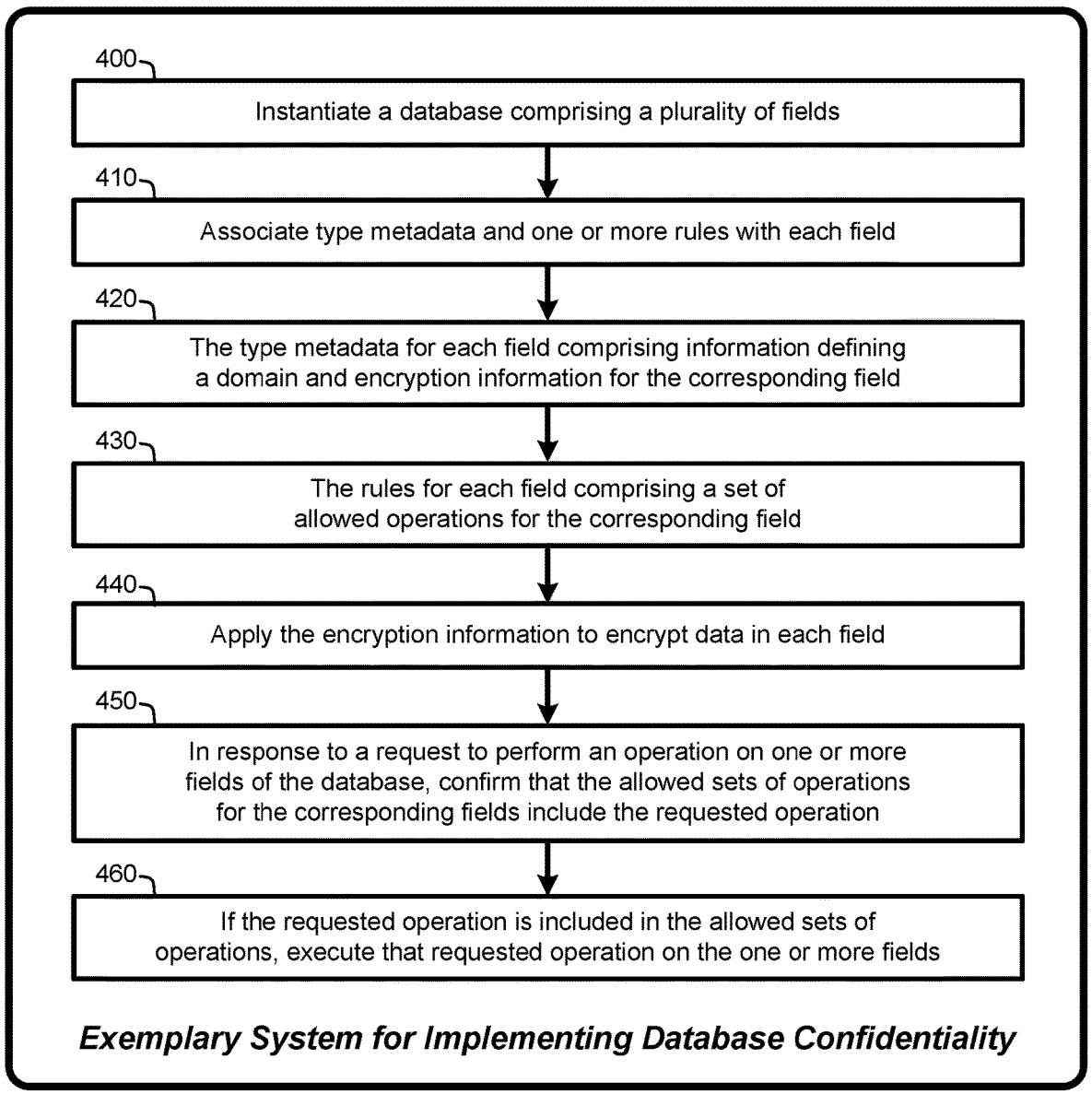
FIG. 4 illustrates a general flow diagram that illustrates exemplary techniques for effecting various implementations of the Database Confidentiality System, as described herein.
Figure 5:
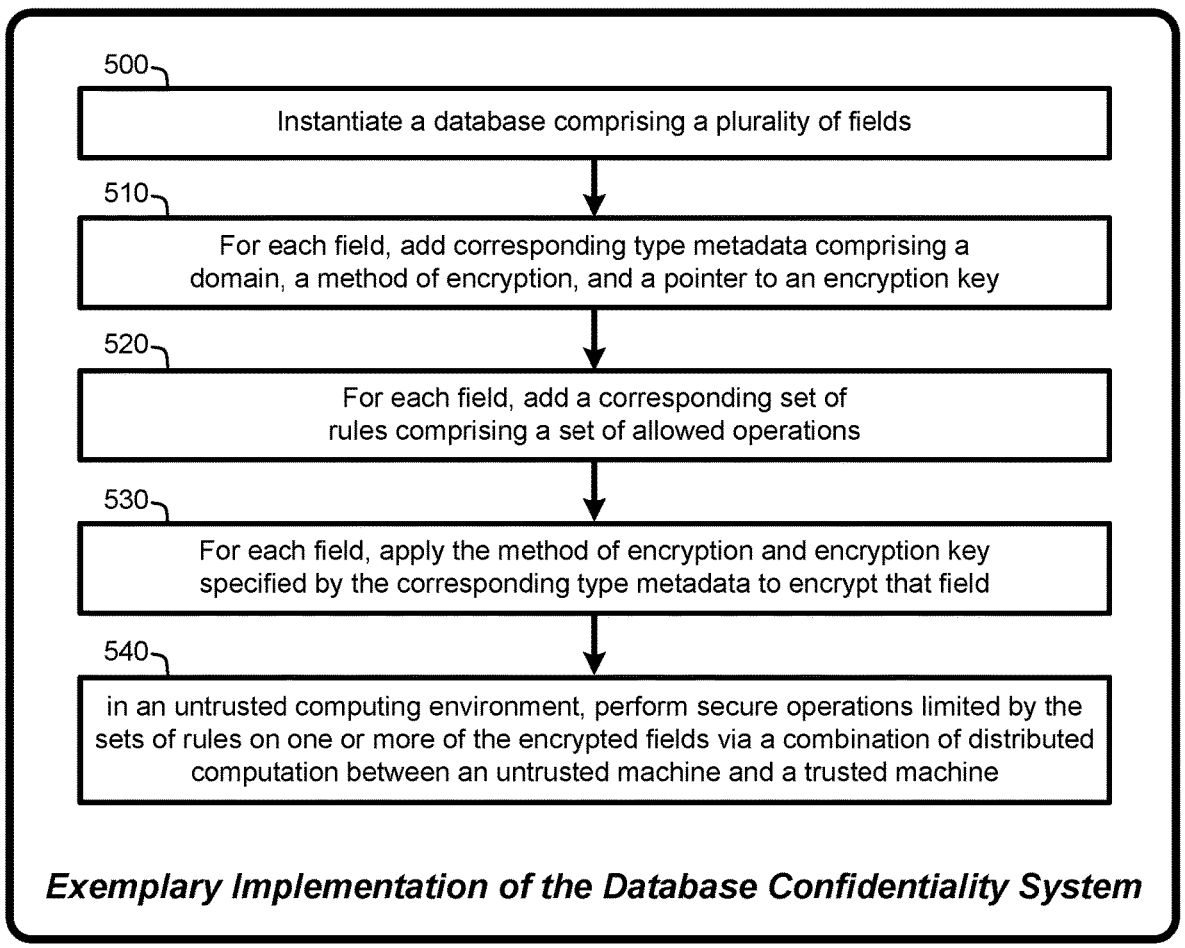
FIG. 5 illustrates a general flow diagram that illustrates exemplary techniques for effecting various implementations of the Database Confidentiality System, as described herein.

3.0 Operational Summary of the Database Confidentiality System:

The processes described above with respect to FIG. 1 and FIG. 2, and in further view of the detailed description provided above in Sections 1 and 2, are illustrated by the general operational flow diagrams of FIG. 3 through FIG. 5. In particular, FIG. 3 through FIG. 5 provide exemplary operational flow diagrams that summarizes the operation of some of the various implementations of the Database Confidentiality System. FIG. 3 through FIG. 5 are not intended to provide an exhaustive representation of all of the various implementations of the Database Confidentiality System described herein, and the implementations represented in these figures are provided only for purposes of explanation.

Further, any boxes and interconnections between boxes that may be represented by broken or dashed lines in FIG. 3 through FIG. 5 represent optional or alternate implementations of the Database Confidentiality System described herein, and that any or all of these optional or alternate implementations, as described below, may be used in combination with other alternate implementations that are described throughout this document.

In general, as illustrated by FIG. 3, in various implementations, the Database Confidentiality System begins operation by instantiating (300) a database comprising a plurality of fields. Next, type metadata is added (310) to each field. In various implementations, this type metadata includes, but is not limited to, information defining a domain of the corresponding field, a method of encryption of the corresponding field, and a reference to a key used to encrypt data in the corresponding field. Further, a set of rules is added (320) to each field. In various implementations, the set of rules for each field includes information defining a restricted set of operations that are allowed to be performed on the corresponding field. Data in each field is then encrypted (330) with the method of encryption and the referenced key defined by the corresponding type metadata. Further, in various implementations, the type metadata and the rules are safeguarded (340) from unauthorized modification via an integrity protection mechanism. Given this configuration, the Database Confidentiality System performs (350) secure operations limited by the sets of rules on one or more of the encrypted fields via a combination of distributed computation and communications between a potentially untrusted machine (UM) and a trusted machine (TM).

Similarly, as illustrated by FIG. 4, in various implementations, the Database Confidentiality System is implemented in a computing system comprising at least one processor and memory that stores instructions executable by the at least one processor. These instructions configure the computing system to instantiate (400) a database comprising a plurality of fields. In addition, these instructions configure the computing system to associate (410) type metadata and one or more rules with each field. In various implementations, the type metadata for each field comprises (420) information defining a domain and encryption information (e.g., encryption method and encryption key) for the corresponding field. Further, in various implementations, the rules for each field comprise (430) a set of allowed operations for the corresponding field. The encryption information is applied (440) to encrypt data in each field. In addition, in response to a request to perform an operation on one or more fields of the database, the computing system confirms (450) that the allowed sets of operations for the corresponding fields include the requested operation. Finally, if the requested operation is included in the allowed sets of operations, the computing system executes (460) that requested operation on the one or more fields.

Similarly, as illustrated by FIG. 5, in various implementations, the Database Confidentiality System begins operation by instantiating (500) a database comprising a plurality of fields. Further, for each field, the Database Confidentiality System adds (510) corresponding type metadata comprising a domain, a method of encryption, and a pointer to an encryption key. In addition, for each field, the Database Confidentiality System adds (520) a corresponding set of rules comprising a set of allowed operations. Further, for each field, the Database Confidentiality System applies (530) the method of encryption and encryption key specified by the corresponding type metadata to encrypt that field. Finally, in an untrusted computing environment, the Database Confidentiality System performs (540) secure operations limited by the sets of rules on one or more of the encrypted fields via a combination of distributed computation between an untrusted machine and a trusted machine.

4.0 Exemplary Implementations:

The following paragraphs summarize various examples of implementations of the Database Confidentiality System that may be claimed in the present document. The implementations summarized below are not intended to limit the subject matter that may be claimed in view of the detailed description of the Database Confidentiality System. Further, any or all of the implementations summarized below may be claimed in any desired combination with some or all of the implementations described throughout the detailed description and any implementations illustrated in one or more of the figures, and any other implementations and examples described below. The following implementations and examples are intended to be understood in view of the detailed description and figures described throughout this document.

In various implementations, a Database Confidentiality System is implemented by means, processes or techniques for using server-side trusted computing in combination with configurable type metadata and rules associated with individual database fields to implement database confidentiality. As such, the Database Confidentiality System enhances database security in potentially untrusted computing environments and in computing environments that may be subject to active and/or passive attacks.

As a first example, in various implementations, a method is implemented via means, processes or techniques for securing database operations (e.g., database confidentiality) on a database comprising a plurality of fields. In various implementations, this confidentiality is implemented, in part, by associating type metadata and rules with each field of the database. The type metadata for each field includes, but is not limited to, a domain of the corresponding field, a method of encryption of the corresponding field, and a reference to a key used to encrypt data in the corresponding field. The set of rules for each field includes, but is not limited to, a restricted set of operations that are allowed to be performed on the corresponding field. The data in each of the fields is then encrypted using the method of encryption and the referenced key defined by the corresponding type metadata. In various implementations, the type metadata and the rules are protected from unauthorized modification via an integrity protection mechanism (e.g., limiting access on a per-computer and/or per-user basis, encryption, read-only configurations, MAC-based accesses, etc.). Given this type of database setup, the Database Confidentiality System performs secure operations limited by the sets of rules on one or more of the encrypted fields via a combination of distributed computation and communications between a potentially untrusted machine (UM) and a trusted machine (TM).

As a second example, in various implementations, the first example is further modified via means, processes or techniques further comprising encrypting one or more inputs and one or more outputs of the trusted machine.

As a third example, in various implementations, any of the first example and the second example are further modified via means, processes or techniques further comprising applying different keys to encrypt inputs and outputs of the trusted machine.

As a fourth example, in various implementations, any of the first example, the second example and the third example are further modified via means, processes or techniques further comprising concealing one or more expressions executed by the trusted machine.

As a fifth example, in various implementations, any of the first example, the second example, the third example and the fourth example are further modified via means, processes or techniques further comprising limiting the number of calls that can be made to the trusted machine.

As a sixth example, in various implementations, any of the first example, the second example, the third example, the fourth example and the fifth example are further modified via means, processes or techniques further comprising padding one or more length bounded domains to make the padded domains length indistinguishable.

As a seventh example, in various implementations, any of the first example, the second example, the third example, the fourth example, the fifth example and the sixth example are further modified via means, processes or techniques wherein adding the set of rules to each field further comprises a program registration process wherein, for each rule, a registration message containing a specification of the restricted set of operations and the encryption keys of all input and output types of those operations is transmitted to the trusted machine and applied to the database by the trusted machine.

As an eighth example, in various implementations, the seventh example is further modified via means, processes or techniques further comprising encrypting the registration message using a public key of the trusted machine.

As a ninth example, in various implementations, any of the seventh example and the eighth example are further modified via means, processes or techniques wherein the program registration process is a lazy process wherein the registration message associated with a particular operation is only sent to the trusted machine if that particular operation is to be used to interact with the corresponding field.

As a tenth example, in various implementations, any of the first example, the second example, the third example, the fourth example, the fifth example, the sixth example, the seventh example, the eighth example and the ninth example are further modified via means, processes or techniques wherein further comprising safeguarding error results of the secure operations from unauthorized viewing or access via an integrity protection mechanism.

As an eleventh example, in various implementations, a system is implemented within a computing system via means, processes or techniques for securing database operations. In various implementations, these secure operations are implemented by instantiating a database comprising a plurality of fields. Next, type metadata and one or more rules are associated with each field. In various implementations, the type metadata for each field comprises information defining a domain and encryption information for the corresponding field. Further, in various implementations, the rules for each field comprise a set of allowed operations for the corresponding field. The encryption information is then applied to encrypt data in each field. Further, in response to a request to perform an operation on one or more fields of the database, the system confirms that the allowed sets of operations for the corresponding fields include the requested operation. Finally, if the requested operation is included in the allowed sets of operations, execute that requested operation on the one or more fields.

As a twelfth example, in various implementations, the eleventh example is further modified via means, processes or techniques wherein executing the operation further comprises executing the operation on either a trusted machine (TM) component of the system or an untrusted machine (UM) component of system, or on a combination of both the TM and the UM, and wherein the choice between execution via the TM or the UM, or a combination of both the TM and the UM, is determined as a combined function of the type metadata and the rules of the corresponding fields.

As a thirteenth example, in various implementations, any of the eleventh example and the twelfth example are further modified via means, processes or techniques further comprising safeguarding the type metadata and the rules from unauthorized modification via an integrity protection mechanism.

As a fourteenth example, in various implementations, any of the eleventh example, the twelfth example, and the thirteenth example are further modified via means, processes or techniques further comprising safeguarding error results of the requested operation from unauthorized viewing or access via an integrity protection mechanism.

As a fifteenth example, in various implementations, any of the eleventh example, the twelfth example, the thirteenth example, and the fourteenth example are further modified via means, processes or techniques further comprising limiting the number of calls that can be made to the trusted machine.

As a sixteenth example, in various implementations, the twelfth example and any of the thirteenth example, the fourteenth example, and the fifteenth are further modified via means, processes or techniques further comprising concealing one or more expressions executed by the TM.

As a seventeenth example, in various implementations, the Database Confidentiality System is implemented via means, processes or techniques for securing database operations on a database comprising a plurality of fields. In various implementations, these secure database operations are implemented by adding, to each field, corresponding type metadata comprising a domain, a method of encryption, and a pointer to an encryption key. Further, for each field, the Database Confidentiality System adds a corresponding set of rules comprising a set of allowed operations. In addition, for each field, the Database Confidentiality System applies the method of encryption and encryption key specified by the corresponding type metadata to encrypt that field. Finally, in an untrusted computing environment, the Database Confidentiality System then performs secure operations limited by the sets of rules on one or more of the encrypted fields via a combination of distributed computation between an untrusted machine and a trusted machine.

As an eighteenth example, in various implementations, the seventeenth example is further modified via means, processes or techniques further comprising safeguarding the type metadata and the rules from unauthorized modification via an integrity protection mechanism.

As a nineteenth example, in various implementations, any of the seventeenth example and the eighteenth are further modified via means, processes or techniques wherein adding the corresponding set of rules to each field further comprises a program registration process wherein, for one or more rules, a registration message containing a specification of the allowed operations is provided to the trusted machine and applied to the database by the trusted machine.

As a twentieth example, in various implementations, the nineteenth example is further modified via means, processes or techniques wherein the program registration process is a lazy process wherein the registration message associated with a particular operation is only provided to the trusted machine when that particular operation is to be used to interact with the corresponding field.

Figure 6:
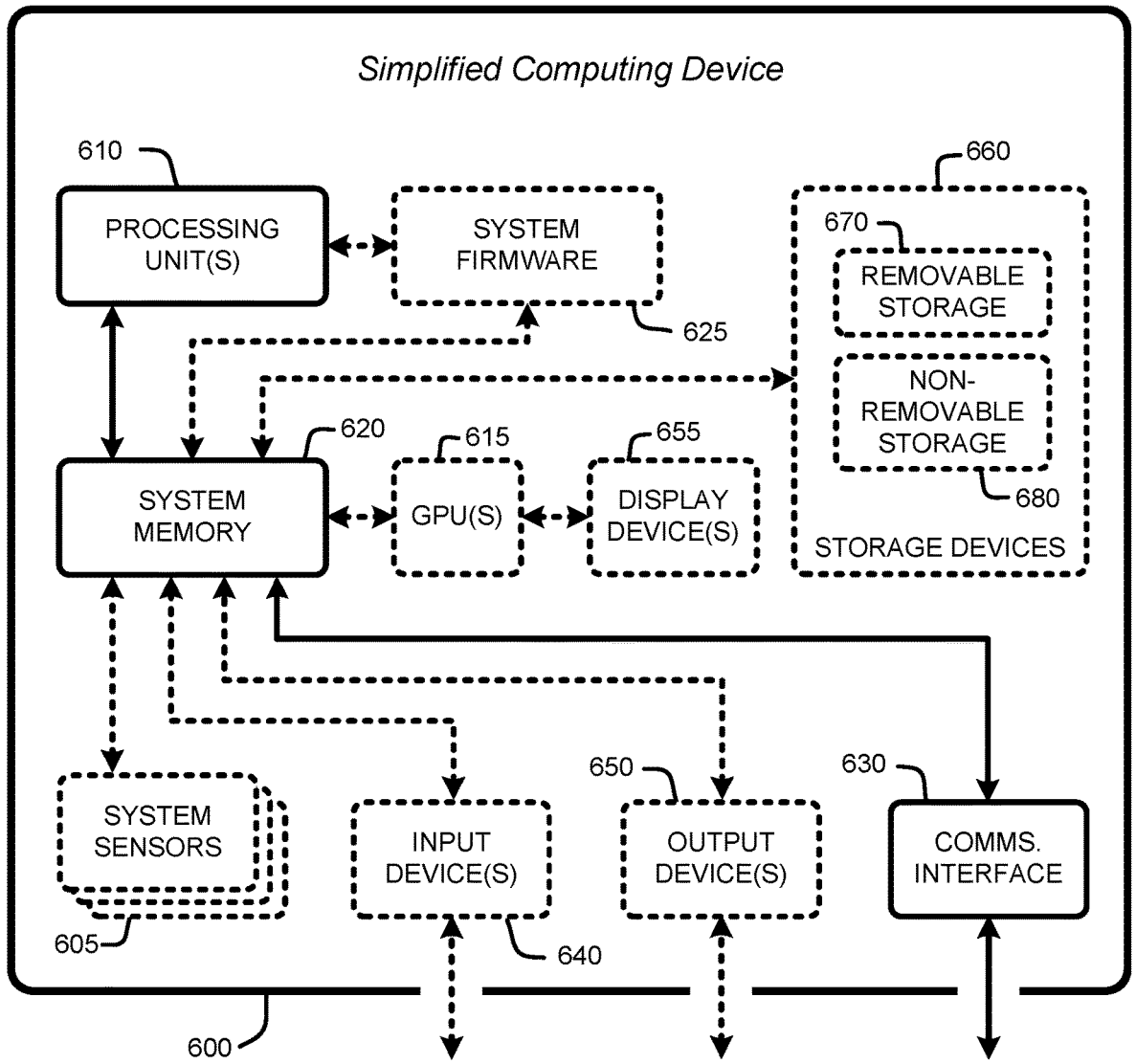
FIG. 6 is a general system diagram depicting a simplified general-purpose computing device having simplified computing and I/O capabilities for use in effecting various implementations of the Database Confidentiality System, as described herein.

5.0 Exemplary Operating Environments:

The Database Confidentiality System implementations described herein are operational within numerous types of general purpose or special purpose computing system environments or configurations. FIG. 6 illustrates a simplified example of a general-purpose computer system on which various implementations and elements of the Database Confidentiality System, as described herein, may be implemented. Any boxes that are represented by broken or dashed lines in the simplified computing device 600 shown in FIG. 6 represent alternate implementations of the simplified computing device. As described below, any or all of these alternate implementations may be used in combination with other alternate implementations that are described throughout this document.

The simplified computing device 600 is typically found in devices having at least some minimum computational capability such as personal computers (PCs), server computers, handheld computing devices, laptop or mobile computers, communications devices such as cell phones and personal digital assistants (PDAs), multiprocessor systems, microprocessor-based systems, set top boxes, programmable consumer electronics, network PCs, minicomputers, mainframe computers, and audio or video media players.

To allow a device to realize the Database Confidentiality System implementations described herein, the device should have a sufficient computational capability and system memory to enable basic computational operations. In particular, the computational capability of the simplified computing device 600 shown in FIG. 6 is generally illustrated by one or more processing unit(s) 610, and may also include one or more graphics processing units (GPUs) 615, either or both in communication with system memory 620. The processing unit(s) 610 of the simplified computing device 600 may be specialized microprocessors (such as a digital signal processor (DSP), a very long instruction word (VLIW) processor, a field-programmable gate array (FPGA), or other micro-controller) or can be conventional central processing units (CPUs) having one or more processing cores and that may also include one or more GPU-based cores or other specific-purpose cores in a multi-core processor.

In addition, the simplified computing device 600 may also include other components, such as, for example, a communications interface 630. The simplified computing device 600 may also include one or more conventional computer input devices 640 (e.g., touchscreens, touch-sensitive surfaces, pointing devices, keyboards, audio input devices, voice or speech-based input and control devices, video input devices, haptic input devices, devices for receiving wired or wireless data transmissions, and the like) or any combination of such devices.

Similarly, various interactions with the simplified computing device 600 and with any other component or feature of the Database Confidentiality System, including input, output, control, feedback, and response to one or more users or other devices or systems associated with the Database Confidentiality System, are enabled by a variety of Natural User Interface (NUI) scenarios. The NUI techniques and scenarios enabled by the Database Confidentiality System include, but are not limited to, interface technologies that allow one or more users user to interact with the Database Confidentiality System in a "natural" manner, free from artificial constraints imposed by input devices such as mice, keyboards, remote controls, and the like.

Such NUI implementations are enabled by the use of various techniques including, but not limited to, using NUI information derived from user speech or vocalizations captured via microphones or other input devices 640 or system sensors 605. Such NUI implementations are also enabled by the use of various techniques including, but not limited to, information derived from system sensors 605 or other input devices 640 from a user's facial expressions and from the positions, motions, or orientations of a user's hands, fingers, wrists, arms, legs, body, head, eyes, and the like, where such information may be captured using various types of 2D or depth imaging devices such as stereoscopic or time-of-flight camera systems, infrared camera systems, RGB (red, green and blue) camera systems, and the like, or any combination of such devices.

Further examples of such NUI implementations include, but are not limited to, NUI information derived from touch and stylus recognition, gesture recognition (both onscreen and adjacent to the screen or display surface), air or contact-based gestures, user touch (on various surfaces, objects or other users), hover-based inputs or actions, and the like. Such NUI implementations may also include, but are not limited to, the use of various predictive machine intelligence processes that evaluate current or past user behaviors, inputs, actions, etc., either alone or in combination with other NUI information, to predict information such as user intentions, desires, and/or goals. Regardless of the type or source of the NUI-based information, such information may then be used to initiate, terminate, or otherwise control or interact with one or more inputs, outputs, actions, or functional features of the Database Confidentiality System.

However, the aforementioned exemplary NUI scenarios may be further augmented by combining the use of artificial constraints or additional signals with any combination of NUI inputs. Such artificial constraints or additional signals may be imposed or generated by input devices 640 such as mice, keyboards, and remote controls, or by a variety of remote or user worn devices such as accelerometers, electromyography (EMG) sensors for receiving myoelectric signals representative of electrical signals generated by user's muscles, heart-rate monitors, galvanic skin conduction sensors for measuring user perspiration, wearable or remote biosensors for measuring or otherwise sensing user brain activity or electric fields, wearable or remote biosensors for measuring user body temperature changes or differentials, and the like. Any such information derived from these types of artificial constraints or additional signals may be combined with any one or more NUI inputs to initiate, terminate, or otherwise control or interact with one or more inputs, outputs, actions, or functional features of the Database Confidentiality System.

The simplified computing device 600 may also include other optional components such as one or more conventional computer output devices 650 (e.g., display device(s) 655, audio output devices, video output devices, devices for transmitting wired or wireless data transmissions, and the like). Typical communications interfaces 630, input devices 640, output devices 650, and storage devices 660 for general-purpose computers are well known to those skilled in the art, and will not be described in detail herein.

The simplified computing device 600 shown in FIG. 6 may also include a variety of computer-readable media. Computer-readable media can be any available media that can be accessed by the computing device 600 via storage devices 660, and include both volatile and nonvolatile media that is either removable 670 and/or non-removable 680, for storage of information such as computer-readable or computer-executable instructions, data structures, program modules, or other data.

Computer-readable media includes computer storage media and communication media. Computer storage media refers to tangible computer-readable or machine-readable media or storage devices such as digital versatile disks (DVDs), Blu-ray discs (BD), compact discs (CDs), floppy disks, tape drives, hard drives, optical drives, solid state memory devices, random access memory (RAM), read-only memory (ROM), electrically erasable programmable read-only memory (EEPROM), CD-ROM or other optical disk storage, smart cards, flash memory (e.g., card, stick, and key drive), magnetic cassettes, magnetic tapes, magnetic disk storage, magnetic strips, or other magnetic storage devices. Further, a propagated signal is not included within the scope of computer-readable storage media.

Retention of information such as computer-readable or computer-executable instructions, data structures, program modules, and the like, can also be accomplished by using any of a variety of the aforementioned communication media (as opposed to computer storage media) to encode one or more modulated data signals or carrier waves, or other transport mechanisms or communications protocols, and can include any wired or wireless information delivery mechanism. The terms "modulated data signal" or "carrier wave" generally refer to a signal that has one or more of its characteristics set or changed in such a manner as to encode information in the signal. For example, communication media can include wired media such as a wired network or direct-wired connection carrying one or more modulated data signals, and wireless media such as acoustic, radio frequency (RF), infrared, laser, and other wireless media for transmitting and/or receiving one or more modulated data signals or carrier waves.

Furthermore, software, programs, and/or computer program products embodying some or all of the various Database Confidentiality System implementations described herein, or portions thereof, may be stored, received, transmitted, or read from any desired combination of computer-readable or machine-readable media or storage devices and communication media in the form of computer-executable instructions or other data structures. Additionally, the claimed subject matter may be implemented as a method, apparatus, or article of manufacture using standard programming and/or engineering techniques to produce software, firmware 625, hardware, or any combination thereof to control a computer to implement the disclosed subject matter. The term "article of manufacture" as used herein is intended to encompass a computer program accessible from any computer-readable device, or media.

The Database Confidentiality System implementations described herein may be further described in the general context of computer-executable instructions, such as program modules, being executed by a computing device. Generally, program modules include routines, programs, objects, components, data structures, and the like, that perform particular tasks or implement particular abstract data types. The Database Confidentiality System implementations may also be practiced in distributed computing environments where tasks are performed by one or more remote processing devices, or within a cloud of one or more devices, that are linked through one or more communications networks. In a distributed computing environment, program modules may be located in both local and remote computer storage media including media storage devices. Additionally, the aforementioned instructions may be implemented, in part or in whole, as hardware logic circuits, which may or may not include a processor.

Alternatively, or in addition, the functionality described herein can be performed, at least in part, by one or more hardware logic components. For example, and without limitation, illustrative types of hardware logic components that can be used include field-programmable gate arrays (FPGAs), application-specific integrated circuits (ASICs), application-specific standard products (ASSPs), system-on-a-chip systems (SOCs), complex programmable logic devices (CPLDs), and so on.

Figure 7:
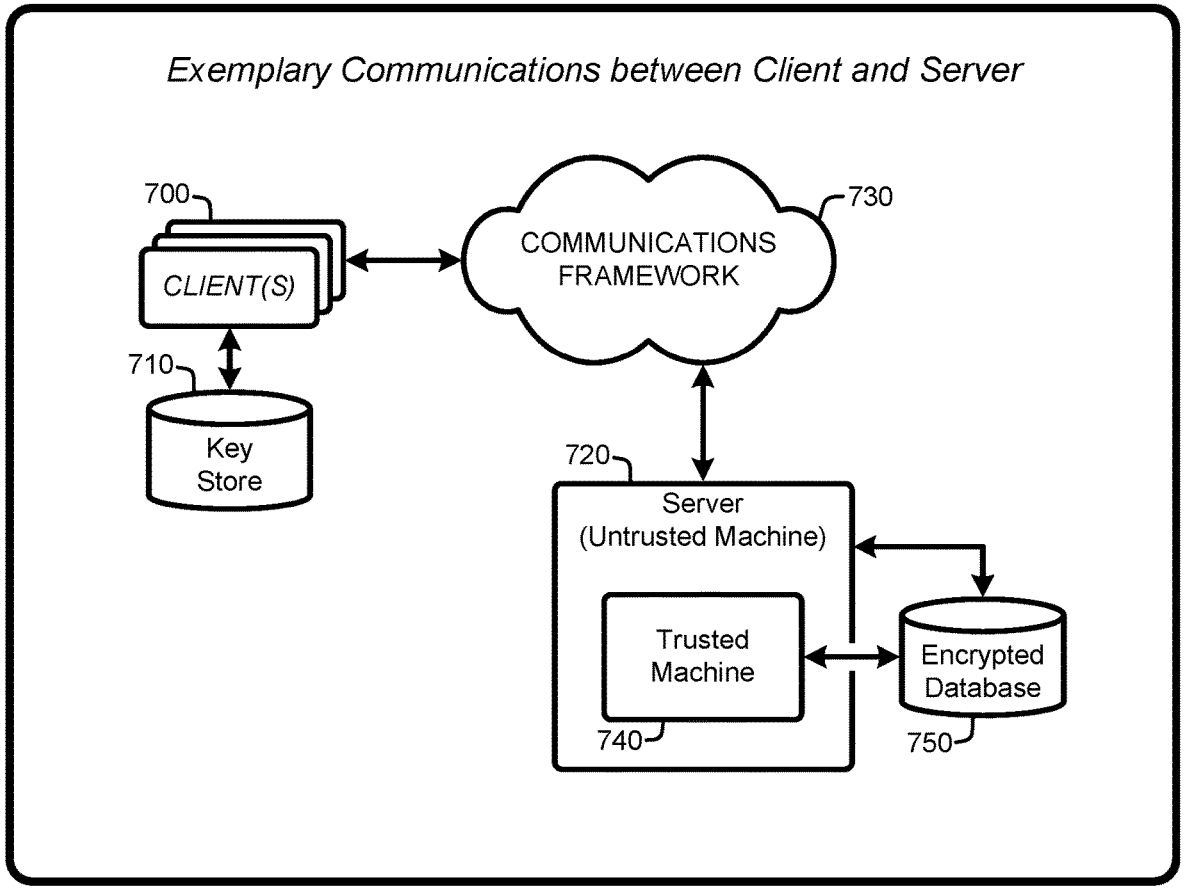
FIG. 7 is a general system diagram depicting simplified communications between one or more client computers and a server computer for effecting various implementations of the Database Confidentiality System, as described herein.

FIG. 7 illustrates an exemplary framework for communications between a plurality of clients and an untrusted server having a trusted machine component (e.g., Intel SGX, FPGAs, TPMs etc.) for implementing the Database Confidentiality System. For example, in various implementations, one or more clients 700, with access to a key store 710 or the like, communicate with a remote server 720 via a communications framework 730. Such communications frameworks include, but are not limited to, any desired combination of existing wired and/or wireless communications techniques to provide communications between clients 700 and server 720 via any combination of networks, intranets, internet, etc. Operations on an encrypted database are performed by the server 720 and a trusted machine component 740 of the server in response to operation requests received from one or more of the clients 700 via the communications framework 730.

6.0 Other Implementations:

The foregoing description of the Database Confidentiality System has been presented for the purposes of illustration and description. It is not intended to be exhaustive or to limit the claimed subject matter to the precise form disclosed. Many modifications and variations are possible in light of the above teaching. Further, any or all of the aforementioned alternate implementations may be used in any combination desired to form additional hybrid implementations of the Database Confidentiality System. It is intended that the scope of the Database Confidentiality System be limited not by this detailed description, but rather by the claims appended hereto. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and other equivalent features and acts are intended to be within the scope of the claims.

What has been described above includes example implementations. It is, of course, not possible to describe every conceivable combination of components or methodologies for purposes of describing the claimed subject matter, but one of ordinary skill in the art may recognize that many further combinations and permutations are possible. Accordingly, the claimed subject matter is intended to embrace all such alterations, modifications, and variations that fall within the spirit and scope of detailed description of the Database Confidentiality System described above.

In regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the claimed subject matter. In this regard, it will also be recognized that the foregoing implementations include a system as well as a computer-readable storage media having computer-executable instructions for performing the acts and/or events of the various methods of the claimed subject matter.

There are multiple ways of realizing the foregoing implementations (such as an appropriate application programming interface (API), tool kit, driver code, operating system, control, standalone or downloadable software object, or the like), which enable applications and services to use the implementations described herein. The claimed subject matter contemplates this use from the standpoint of an API (or other software object), as well as from the standpoint of a software or hardware object that operates according to the implementations set forth herein. Thus, various implementations described herein may have aspects that are wholly in hardware, or partly in hardware and partly in software, or wholly in software.

The aforementioned systems have been described with respect to interaction between several components. It will be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (e.g., hierarchicalcomponents).

Additionally, one or more components may be combined into a single component providing aggregate functionality or divided into several separate sub-components, and any one or more middle layers, such as a management layer, may be provided to communicatively couple to such sub-components in order to provide integrated functionality. Any components described herein may also interact with one or more other components not specifically described herein but generally known to enable such interactions.

What is claimed is:

1. A method for securing database operations, comprising:
   instantiating a database comprising a plurality of fields;
   adding type metadata to each field, the type metadata for each field comprising information defining a domain of the corresponding field, a method of encryption of the corresponding field, and a reference to an encryption key used to encrypt data in the corresponding field;
   adding a set of rules to each field, the set of rules for each field comprising information defining a restricted set of operations that are allowed to be performed on the corresponding field;
   encrypting the data in each field with the method of encryption and the referenced key defined by the corresponding type metadata;
   safeguarding the type metadata and the rules from unauthorized modification via an integrity protection mechanism; and
   in an untrusted computing environment, performing secure operations limited by the sets of rules on one or more of the encrypted fields via a combination of distributed computation between an untrusted machine and a trusted machine.

2. The method of claim 1 further comprising encrypting one or more inputs and one or more outputs of the trusted machine.

3. The method of claim 1 further comprising applying different keys to encrypt inputs and outputs of the trusted machine.

4. The method of claim 1 further comprising concealing one or more expressions executed by the trusted machine.

5. The method of claim 1 further comprising limiting the number of calls that can be made to the trusted machine.

6. The method of claim 1 further comprising padding one or more length bounded domains to make the padded domains length indistinguishable.

7. The method of claim 1 wherein adding the set of rules to each field further comprises a program registration process wherein, for each rule, a registration message containing a specification of the restricted set of operations and the encryption keys of all input and output types of those operations is transmitted to the trusted machine and applied to the database by the trusted machine.

8. The method of claim 7 further comprising encrypting the registration message using a public key of the trusted machine.

9. The method of claim 7 wherein the program registration process is a lazy process wherein the registration message associated with a particular operation is only sent to the trusted machine if that particular operation is to be used to interact with the corresponding field.

10. The method of claim 1 further comprising safeguarding error results of the secure operations from unauthorized viewing or access via an integrity protection mechanism.

11. A computing system comprising:
    at least one processor; and
    memory storing instructions executable by the at least one processor, wherein the instructions configure the computing system to:
       instantiate a database comprising a plurality of fields;
       associate type metadata and one or more rules with each field,
       the type metadata for each field comprising information defining a domain for the corresponding field, a method of encryption for the corresponding field, and a reference to an encryption key used to encrypt data in the corresponding field, the domain defining a range of permitted values for an instance of a type corresponding to the type metadata, and
       the one or more rules for each field comprising information defining a restricted set of operations that are allowed to be performed on the corresponding field;
       encrypt the data in each field with the method of encryption and the referenced key defined by the corresponding type metadata;
       in response to a request to perform an operation on one or more fields of the database, confirm that the restricted sets of operations for the corresponding fields include the requested operation; and
       if the requested operation is included in the restricted sets of operations, execute that requested operation on the one or more fields.

12. The system of claim 11, wherein executing the operation further comprises:
executing the operation on either a trusted machine (TM) component of the system or an untrusted machine (UM) component of system, or on a combination of both the TM and the UM; and
wherein the choice between execution via the TM or the UM, or a combination of both the TM and the UM, is determined as a combined function of the type metadata and the rules of the corresponding fields.

13. The system of claim 11 further comprising safeguarding error results of the requested operation from unauthorized viewing or access via an integrity protection mechanism.

14. The system of claim 11 further comprising limiting the number of calls that can be made to the trusted machine.

15. The system of claim 12 further comprising concealing one or more expressions executed by the TM.

16. A computer-readable storage device having computer-executable instructions stored thereupon which, when executed by a computer, cause the computer to:
instantiate a database comprising a plurality of fields;
for each field, add corresponding type metadata comprising a domain, a method of encryption, and a pointer to an encryption key;
for each field, add a corresponding set of rules comprising a set of allowed operations such that an operation not in the set of allowed operations is not permitted on the plurality of fields;
for each field, apply the method of encryption and encryption key specified by the corresponding type metadata to encrypt that field;
in an untrusted computing environment, perform secure operations limited by the sets of rules on one or more of the encrypted fields via a combination of distributed computation between an untrusted machine and a trusted machine; and
safeguard the type metadata and the rules from unauthorized modification via an integrity protection mechanism.

17. The computer-readable storage device of claim 16 wherein adding the corresponding set of rules to each field further comprises a program registration process wherein, for one or more rules, a registration message containing a specification of the set of allowed operations is provided to the trusted machine and applied to the database by the trusted machine.

18. The computer-readable storage device of claim 17 further wherein the program registration process is a lazy process wherein the registration message associated with a particular operation is only provided to the trusted machine when that particular operation is to be used to interact with the corresponding field.

* * * * *